(12) United States Patent
Sugiyama et al.

(10) Patent No.: US 7,072,568 B2
(45) Date of Patent: Jul. 4, 2006

(54) RECORDING APPARATUS, RECORDING METHOD, REPRODUCING APPARATUS, AND REPRODUCING METHOD

(75) Inventors: Akira Sugiyama, Kanagawa (JP); Haruo Togashi, Kanagawa (JP); Shin Todo, Kanagawa (JP); Hideyuki Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1193 days.

(21) Appl. No.: 09/937,871

(22) PCT Filed: Feb. 1, 2001

(86) PCT No.: PCT/JP01/00704

§ 371 (c)(1),
(2), (4) Date: Oct. 1, 2001

(87) PCT Pub. No.: WO01/58171

PCT Pub. Date: Aug. 9, 2001

(65) Prior Publication Data

US 2002/0154886 A1    Oct. 24, 2002

(30) Foreign Application Priority Data

Feb. 3, 2000 (JP) ................................ 2000-26745

(51) Int. Cl.
*H04N 11/02* (2006.01)
*H04N 9/00* (2006.01)

(52) U.S. Cl. .......................................... 386/33; 386/44
(58) Field of Classification Search ............... 386/33, 386/40, 44, 45, 131; 348/449, 450, 556, 348/557
See application file for complete search history.

(56) References Cited

U.S. PATENT DOCUMENTS 6,297,801 B1 * 10/2001 Jiang ........................... 345/603
6,333,952 B1 * 12/2001 Lim et al. ............... 375/240.27
6,577,352 B1 *  6/2003 Park et al. ................... 348/624

FOREIGN PATENT DOCUMENTS

| JP | 9-121368   | 5/1997 |
| JP | 10-200921  | 7/1998 |
| JP | 11-55623   | 2/1999 |
| JP | 2000-23194 | 1/2000 |

* cited by examiner

*Primary Examiner*—Thai Tran
*Assistant Examiner*—Nigar Chowdhury
(74) *Attorney, Agent, or Firm*—Frommer Lawrence & Haug LLP; William S. Frommer

(57) ABSTRACT

MPEG streams of different chroma formats are recorded and reproduced without need to recognize their formats. In an MPEG stream, a header is followed by DCT blocks. Time slots are generated in such a manner that when the chroma format detected from the header is 4:2:2, in all periods of DCT blocks, a process is performed and that when the chroma format detected from the header is 4:2:0, a process is not performed in periods for DCT blocks $Cb_2$ and $Cr_2$ that are not present in the chroma format 4:2:2. The read order of a stream is changed in a memory so as to improve an error resistance. DCT coefficients are rearranged in the order of DC components and AC components from the lowest order component to the highest order component over all DCT blocks. After the stream has been rearranged, time slots are generated in such as manner that when the chroma format is 4:2:0, the process is stopped in the periods for $Cb_2$ and $Cr_2$. With the time slots, corresponding to the chroma format, the process is controlled so that the chroma formats 4:2:2 and 4:2:0 can be processed in common.

10 Claims, 30 Drawing Sheets

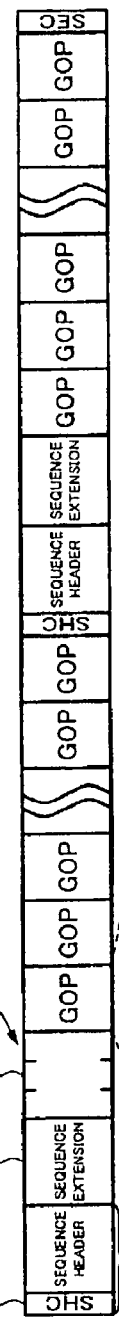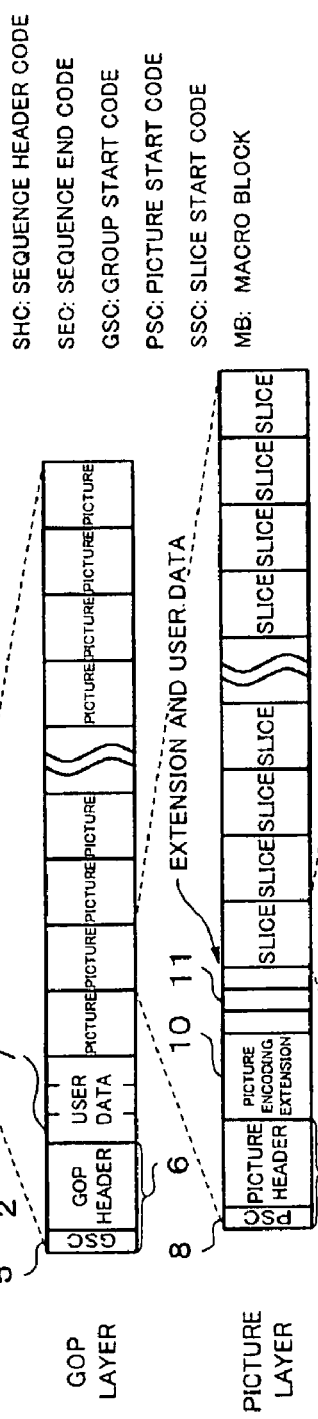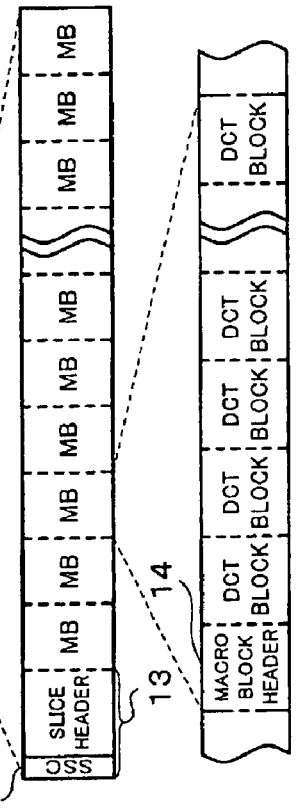
Fig. 1A  SEQUENCE LAYER
Fig. 1B  GOP LAYER
Fig. 1C  PICTURE LAYER
Fig. 1D  SLICE LAYER
Fig. 1E  MACRO BLOCK LAYER
SHC: SEQUENCE HEADER CODE
SEC: SEQUENCE END CODE
GSC: GROUP START CODE
PSC: PICTURE START CODE
SSC: SLICE START CODE
MB: MACRO BLOCK

Fig. 2

| CODE NAME | NUMBER OF BITS | CONTENT |
|---|---|---|
| sequence header code | 32 | SEQUENCE HEADER CODE |
| horizontal size value | 12 | LOW ORDER 12 BITS OF NUMBER OF PIXELS IN HORIZONTAL DIRECTION |
| vertical size value | 12 | LOW ORDER 12 BITS OF NUMBER OF PIXELS IN VERTICAL DIRECTION |
| aspect ratio information | 4 | PIXEL ASPECT RATIO INFORMATION |
| frame rate code | 4 | FRAME RATE CODE |
| bit rate value | 18 | LOW ORDER 18 BITS OF BIT RATE (INDICATION AS BLOCKS OF 400 BITS) |
| vbv buffer size value | 10 | LOW ORDER 10 BITS OF VBV BUFFER SIZE |
| intra quantizer matrix [64] | 8 * 64 | INTRA MB QUANTIZING MATRIX VALUE |
| non intra quantizer matrix [64] | 8 * 64 | NON-INTRA MB QUANTIZING MATRIX VALUE |

Fig. 3

| CODE NAME | NUMBER OF BITS | CONTENT |
|---|---|---|
| extension start code | 32 | START SYNCHRONIZATION CODE OF EXTENSION DATA |
| extension start code identifier | 4 | REPRESENTING WHICH OF EXTENSION DATA IS TRANSMITTED |
| profile and level indication | 8 | REPRESENTING PROFILE AND LEVEL |
| progressive sequence | 1 | REPRESENTING PROGRESSIVE SCANNING |
| chroma format | 2 | DESIGNATING CHROMA (COLOR DIFFERENCE) FORMAT |
| horizontal size extension | 2 | HIGH ORDER 2 BITS OF NUMBER OF PIXELS IN HORIZONTAL DIRECTION OF PICTURE |
| vertical size extension | 2 | HIGH ORDER 2 BITS OF NUMBER OF LINES IN VERTICAL DIRECTION OF PICTURE |
| bit rate extension | 12 | HIGH OEDER 12 BITS OF BIT RATE VALUE |
| marker bit | 1 | PROTECTION FROM EMULATING START CODE |
| vbv buffer size extension | 8 | HIGH ORDER 8 BITS OF VBV BUFFER SIZE |
| low delay | 1 | REPRESENTING THAT B PICTURE IS NOT CONTAINED |
| frame rate extension n | 2 | FRAME RATE EXTENSION |
| frame rate extension d | 5 | FRAME RATE EXTENSION |
| next start code ( ) | | |

Fig. 4

| CODE NAME | NUMBER OF BITS | CONTENT |
|---|---|---|
| extension data (0) | | EXTENSION DATA (0) |
| sequence display extension ( ) | | SEQUENCE INDICATION ( ) |
| sequence scalable extension ( ) | | SEQUENCE SCALABLE EXTENSION ( ) |
| extension start code identifier | 4 | SEQUENCE SCALABLE EXTENSION ID |
| scalable mode | 2 | SCALABILITY MODE |
| layer id | 4 | LAYER ID OF SCALABLE HIERARCHY |
| SPATIAL SCALABILITY | | |
| lower layer prediction horizontal size | 14 | HORIZONTAL SIZE OF PREDICTIVE LOWER LAYER |
| lower layer prediction vertical size | 14 | VERTICAL SIZE OF PREDICTIVE LOWER LAYER |
| vertical subsampling factor n | 5 | DIVISOR FOR UP SAMPLE IN VERTICAL DIRECTION |
| TEMPORAL SCALABILITY | | |
| picture mux order | 3 | NUMBER OF PICTURES OF ADDITIONAL LAYER FOLLOWED BY FIRST BASE LAYER |
| picture mux factor | 3 | NUMBER OF PICTURES OF ADDITIONAL LAYER BETWEEN BASE LAYERS |
| user data ( ) | | USER DATA ( ) |
| user data | 8 | USER DATA |

Fig. 5

| CODE NAME | NUMBER OF BITS | CONTENT |
|---|---|---|
| group start code ( ) | 32 | GOP START CODE |
| time code | 25 | TIME CODE (HOUR, MINUTE, SECOND, PICTURE) |
| closed gop | 1 | FLAG REPRESENTING INDEPENDENSY OF GOP |
| broken link | 1 | FLAG REPRESENTING VALIDITY OF B PICTURE FOLLOWED BY I PICTURE OF GOP |

Fig. 6

| CODE NAME | NUMBER OF BITS | CONTENT |
|---|---|---|
| extension data (1) | | EXTENSION DATA (1) |
| user data ( ) | | USER DATA ( ) |
| user data | 8 | USER DATA |

Fig. 7

| CODE NAME | NUMBER OF BITS | CONTENT |
|---|---|---|
| picture start code | 32 | PICTURE START CODE |
| temporal reference | 10 | DISPLAY SEQUENCE OF PICTURES IN GOP (MODULO 1024) |
| picture coding type | 3 | PICTURE ENCODING TYPE (I, B, P) |
| vbv delay | 16 | VBV DELAY AMOUNT UNTILL START OF DECODING |

Fig. 8

| CODE NAME | NUMBER OF BITS | CONTENT |
|---|---|---|
| f code [s][t] | 4 | RANGE OF MOVING VECTOR IN FORWARD/BACKWARD DIRECTIONS (s) AND HORIZONTAL/VERTICAL DIRECTIONS (t) |
| intra dc precision | 2 | ACCURACY OF DC COEFFICIENTS OF INTRA MB |
| picture structure | 2 | PICTURE STRUCTURE (FRAME, FIELD) |
| top field first | 1 | DESIGNATING DISPLAY FIELD |
| frame pred frame dct | 1 | FRAME PREDICTION + FRAME DCT FLAG |
| concealment motion vectors | 1 | INTRA MB CONSEALMENT MV FLAG |
| q scale type | 1 | QUANTIZING SCALE TYPE (LINEAR, NON-LINEAR) |
| intra vlc format | 1 | VLC TYPE FOR INTRA MB |
| alternate scan | 1 | SCANNING TYPE (ZIGZAG, ALTERNATE) |
| repeat first field | 1 | 2 : 3 PULL-DOWN FIELD REPEAT |
| chroma 420 type | 1 | SAME VALUE AS PROGESSIVE FRAME IN CHROMA FORMAT 4 : 2 : 0 |
| progressive frame | 1 | PROGRESSIVE FRAME FLAG |

Fig. 9

| CODE NAME | NUMBER OF BITS | CONTENT |
|---|---|---|
| extension data (2) | | EXTENSION DATA (2) |
| quant matrix extension ( ) | | QUANTIZING MATRIX EXTENSION ( ) |
| intra quantiser matrix [64] | 8 * 64 | INTRA MB QUANTIZING MATRIX |
| non intra quantiser matrix [64] | 8 * 64 | NON-INTRA MB QUANTIZING MATRIX |
| chroma intra quantiser matrix [64] | 8 * 64 | CHROMA INTRA QUANTIZING MATRIX |
| chroma non intra quantiser matrix [64] | 8 * 64 | CHROMA NON-INTRA QUANTIZING MATRIX |
| copyright extension ( ) | | COPYLIGHT EXTENSION ( ) |
| picture display extension ( ) | | PICTURE DISPLAY EXTENSION ( ) |
| picture spatial scalable extension ( ) | | PICTURE SPACE SCALABLE EXTENSION ( ) |
| spatial temporal weight code table index | 2 | SPATIAL AND TEMPORAL WEIGHTING TABLE FOR UP SAMPLE |
| lower layer progressive frame | 1 | LOWER LAYER PROGRESSIVE PICTURE FLAG |
| lower layer deinterlaced field select | 1 | LOWER LAYER FIELD SELECTION |
| picture temporal scalable extension ( ) | | PICTURE TEMPORAL SCALABLE EXTENSION ( ) |
| reference select code | 2 | SELECTION OF REFERENCE SCREEN |
| forward temporal reference | 10 | PICTURE NUMBER OF FORWARD PREDICTIVE LOWER LAYER |
| backward temporal reference | 10 | PICTURE NUMBER OF BACKWARD PREDICTIVE LOWER LAYER |
| user data ( ) | | USER DATA ( ) |
| user data ( ) | 8 | USER DATA |

Fig. 10

| CODE NAME | NUMBER OF BITS | CONTENT |
|---|---|---|
| slice start code | 32 | SLICE START CODE + SLICE VERTICAL POSITION |
| slice vertical position extension | 3 | SLICE VERTICAL POSITION EXTENSION ( > 2800 LINES ) |
| priority breakpoint | 7 | DATA PARTITIONING BREAKPOINT |
| quantiser scale code | 5 | QUANTIZING SCALE CODE (1 TO 31) |
| intra slice | 1 | INTRA SLICE FLAG |
| macroblock ( ) | | MACRO BLOCK DATA ( ) |

Fig. 11

| CODE NAME | NUMBER OF BITS | CONTENT |
|---|---|---|
| macroblock escape | 11 | MB ADDRESS EXTENSION ( > 33 ) |
| macroblock address increment | 1–11 | DIFFERENCE BETWEEN CURRENT MB ADDRESS AND PRECEDING MB ADDRESS |
| macroblock modes ( ) | | MACRO BLOCK MODE ( ) |
| macroblock type | 1–9 | MB ENCODING TYPE ( MC, CODED, etc ) |
| spatial temporal weight code | 2 | TEMPORAL/SPATIAL WEIGHTING CODE FOR UP SAMPLE |
| frame motion type | 2 | MOTION COMPENSATION TYPE OF FRAME STRUCTURE |
| field motion type | 2 | MOTION COMPENSATION TYPE OF FIELD STRUCTURE |
| dct type | 1 | DCT TYPE (FRAME, FIELD) |
| quantiser scale code | 5 | MB QUANTIZING SCALE CODE (1 TO 31) |
| motion vectors (s) | | MOVING VECTOR (s) |
| motion vertical field select [r][s] | 1 | SELECTION OF REFERENCE FIELD USED FOR PREDICTION |
| motion vector (r, s) | | MOVING VECTOR (r, s) |
| motion code [r][s][t] | 1–11 | BASIC DIFFERENCE MOVING VECTOR |
| motion residual [r][s][t] | 1–8 | DIFFERENCE VECTOR |
| dmvector [t] | 1–2 | DIFFERENCE VECTOR FOR DUAL PRIME |
| coded block pattern ( ) | | CBP |
| block (i) | | BLOCK DATA ( ) |

Fig. 12

| CODE NAME | NUMBER OF BITS | CONTENT |
|---|---|---|
| dct dc size luminance | 2-9 | DCT LUMINANCE DC COEFFICIENT DIFFERENCE SIZE |
| dct dc differential | 1-11 | DCT LUMINANCE DC COEFFICIENT DIFFERENCE VALUE |
| dct dc size chrominance | 2-10 | DCT CHROMINANCE DC COEFFICIENT DIFFERENCE SIZE |
| dct dc differential | 1-11 | DCT CHROMINANCE DC COEFFICIENT DIFFERENCE VALUE |
| First DCT coefficient | 3-24 | FIRST NON-ZERO COEFFICIENT OF NON-INTRA BLOCK |
| Subsequent DCT coefficient | 2-24 | DCT COEFFICIENT THAT FOLLOWS |
| End of block | 2 or 4 | DCT COEFFICIENT END FLAG IN BLOCK |

Fig. 13A

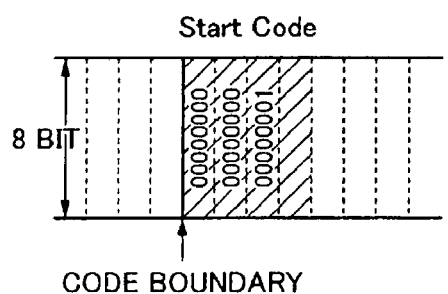

Fig. 13B

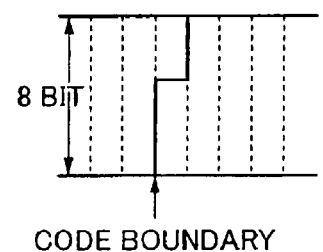

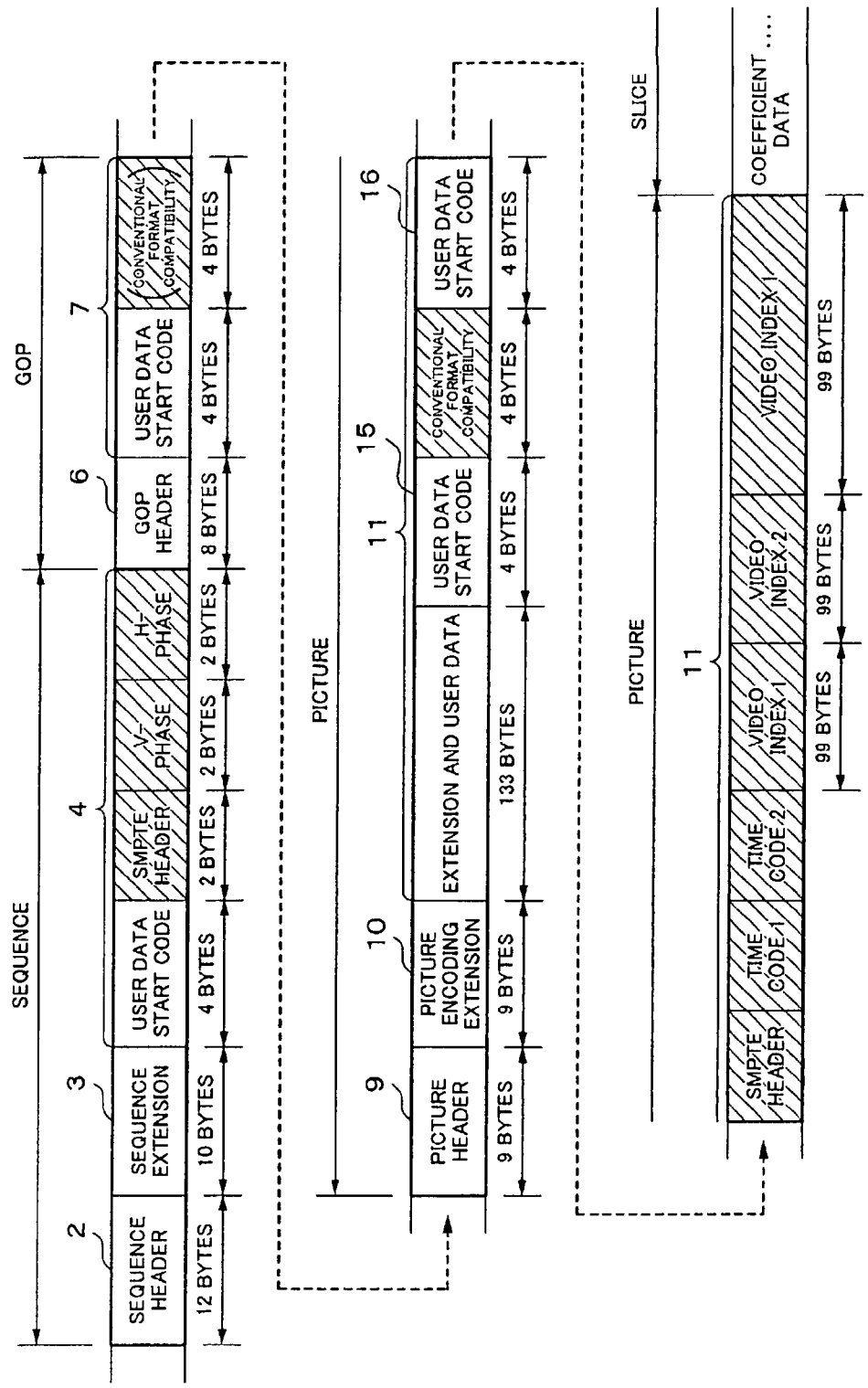

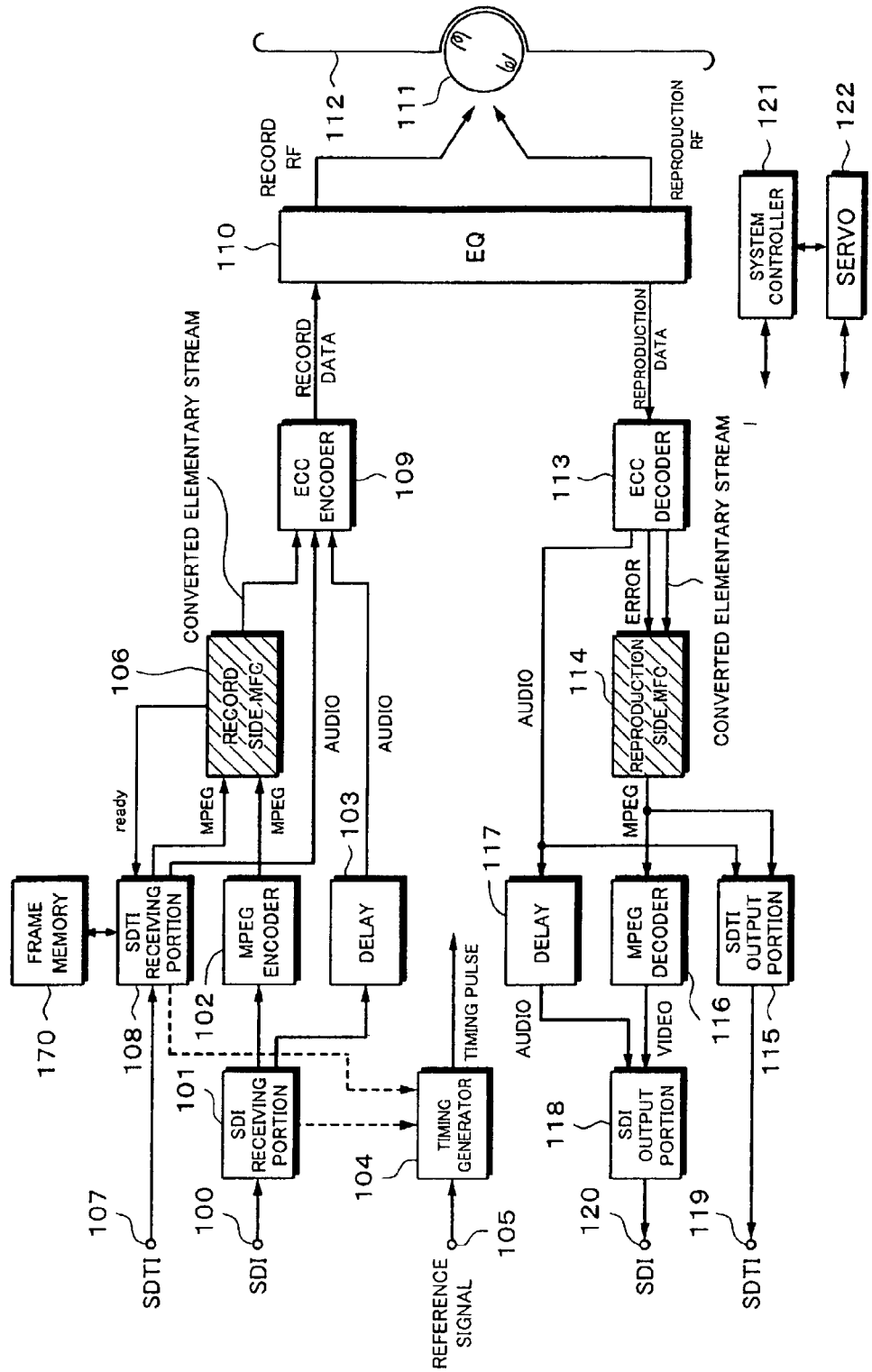

TRACKING DIRECTION OF HEAD

4:4:4

× LUMINANCE SIGNAL (Y)
⊘ COLOR DIFFERENCE SIGNAL (Cr)
　COLOR DIFFERENCE SIGNAL (Cb)

4:2:2

× LUMINANCE SIGNAL (Y)
⊘ COLOR DIFFERENCE SIGNAL (Cr)
　COLOR DIFFERENCE SIGNAL (Cb)

X  LUMINANCE SIGNAL (Y)
⊘ ← COLOR DIFFERENCE SIGNAL (Cr)
    ← COLOR DIFFERENCE SIGNAL (Cb)

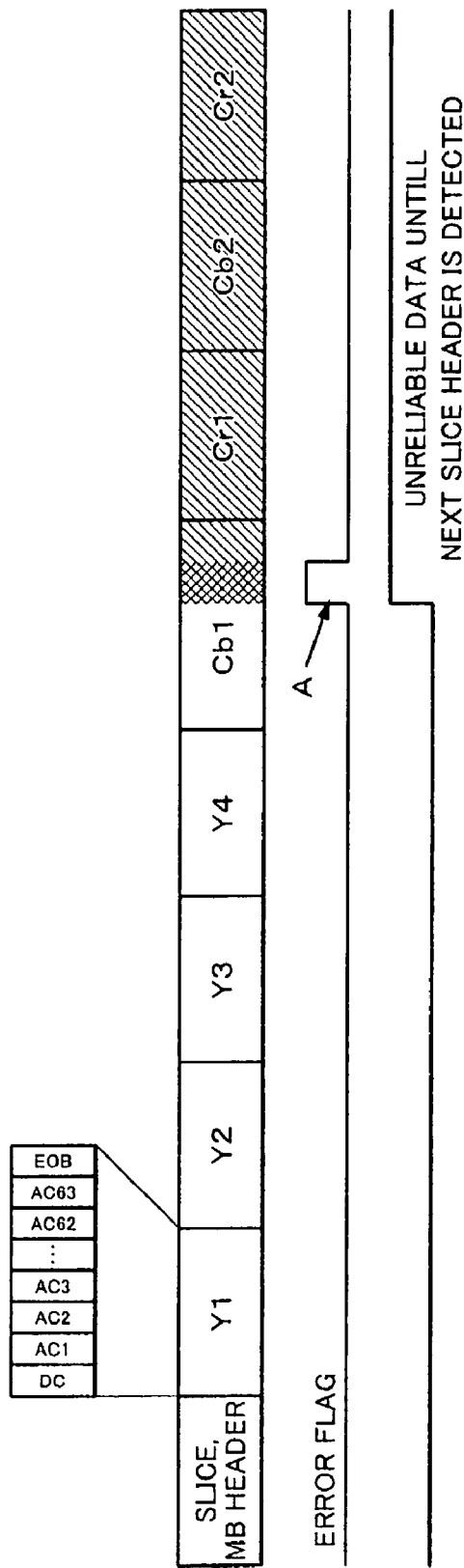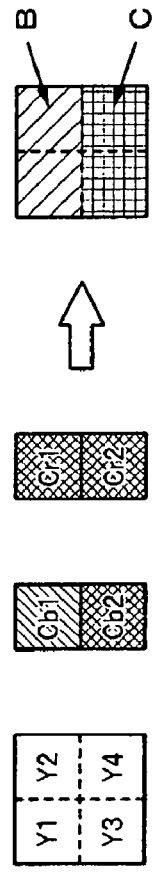
Fig. 23A
Fig. 23B

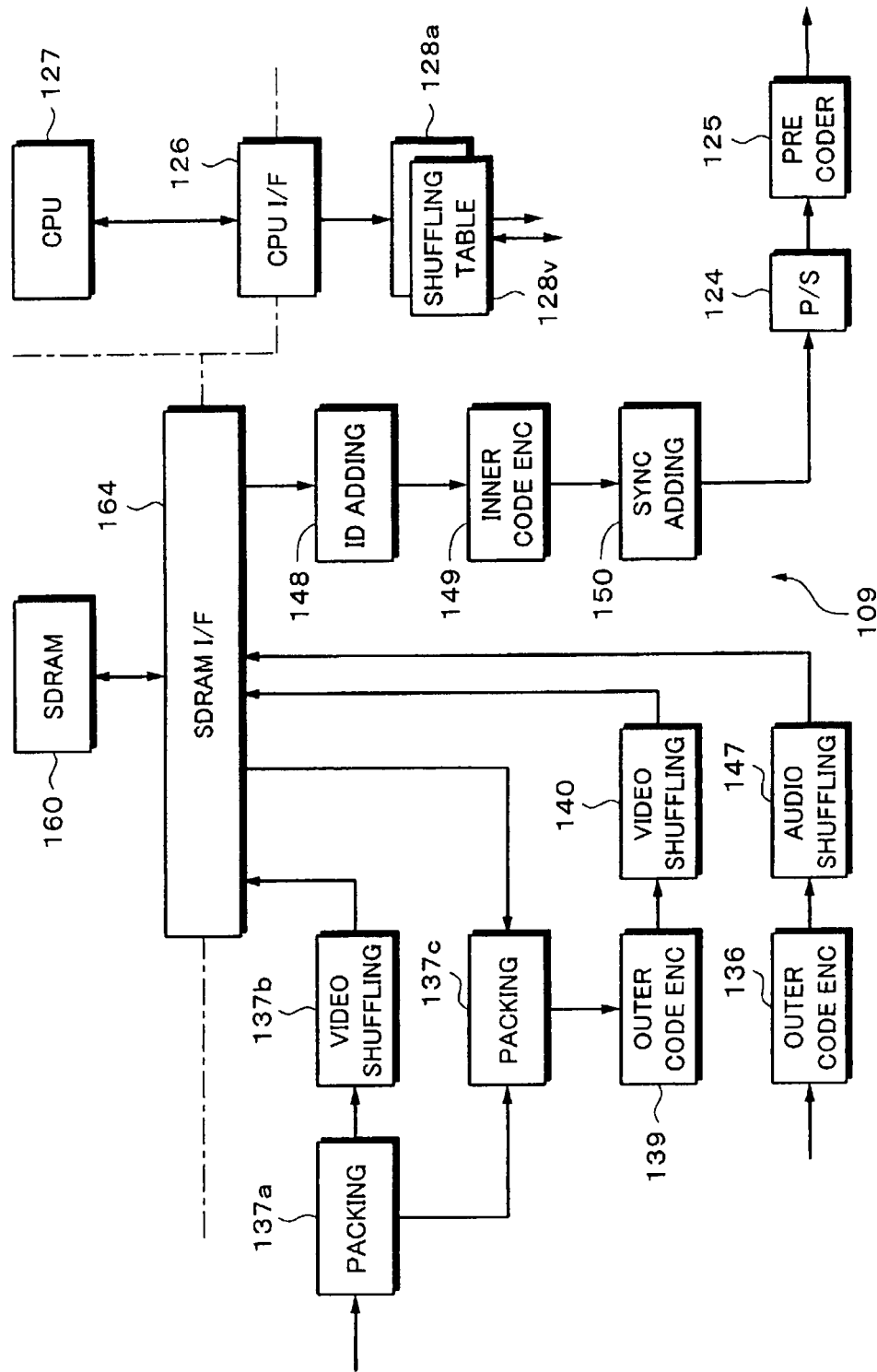

Fig. 32

| chrima format | CHROMA FORMAT |
|---|---|
| 00 | (reserved) |
| 01 | 4:2:0 |
| 10 | 4:2:2 |
| 11 | 4:4:4 |

RECORDING APPARATUS, RECORDING METHOD, REPRODUCING APPARATUS, AND REPRODUCING METHOD

TECHNICAL FIELD

The present invention relates to a recording apparatus, a recording method, a reproducing apparatus, and a reproducing method that allow digital video signals in different chroma formats to be recorded and reproduced.

BACKGROUND ART

In recent years, as a compression-encoding format for a digital video signal, an encoding format named MPEG (Moving Picture Experts Group) has been widely used. The MPEG2 is a standard for a compression of moving pictures using DCT (Discrete Cosine Transform) and prediction encoding. Currently, since MPEG2 features higher expansibility and higher picture quality than the MPEG, the former has been more used than the latter. Next, the MEPG2 will be mainly described in comparison with the MPEG.

According to the MPEG, picture data for one frame is divided into macro blocks each having a predetermined size. Each macro block is predictively encoded using a moving vector. Each DCT block into which each macro block is further divided is encoded using DCT and thus encoded with variable length code. In each DCT block, DCT coefficients are arranged from a DC component to higher order AC components. For digital video data in a chroma format 4:2:2, each macro block is composed of a total of eight DCT blocks that are four DCT blocks as luminance components Y, two DCT blocks as color difference components Cr, and two DCT blocks as color difference components Cb. In each macro block, for example, four DCT blocks as luminance components Y, two DCT blocks as color difference components Cr, and two DCT blocks as color difference components Cb are arranged in succession.

In contrast, data of the MPEG2 is composed of a data stream having a hierarchical structure of a sequence layer as the highest layer, a GOP (Group Of Picture) layer, a picture layer, a slice layer, a macro block (MB) layer as the lowest layer. Each layer includes at least one lower hierarchical structure. Each layer has a header portion. In addition, each layer except for the macro block layer has a start code preceded by the header portion. The slice layer is the minimum unit necessary for decoding variable length code.

A picture corresponds to one screen. Three types of pictures that are an I picture, a P picture, and a B picture have been defined. The I picture is a picture that is intra-frame encoded. The P picture and the B picture are pictures that are predictively encoded.

The header of each layer describes various parameters necessary for encoding an MPEG stream. The parameters are for example profile, level, bit rate, and chroma format of the stream. Corresponding to parameters described in each header, an MPEG decoder can correctly decode the input MPEG stream.

A recording and reproducing apparatus that directly records the above-described MPEG stream to a record medium such as a magnetic tape and reproduces a recorded MPEG stream therefrom has been proposed. In such a recording and reproducing apparatus, one macro block is contained in a sync block that is the minimum data unit that is recorded. A predetermined number of sync blocks are placed on one track. With a predetermined number of tracks, data of one picture (one frame) is recorded. Tracks are formed as helical tracks of which a rotating head helically traces a magnetic tape.

As described above, an MPEG stream is compression-encoded using variable length code. On the other hand, fixed-length blocks referred to as sync blocks are recorded on a magnetic tape. In other words, it is necessary to place an MPEG stream composed of variable length code in packets each having a fixed length. In the MPEG stream, although each block (macro block) is variable length code, the bit rate of one picture (one frame) is constant. When the MPEG stream is recorded, each macro block that is variable length code is placed in the data storage area (referred to as payload) of each sync block. The portion that cannot be placed in a packet whose variable length code is less than the length of the payload. In such a manner, variable length code is converted into fixed length code. This process is referred to as packing. When data is reproduced, the reverse process of the recording operation is performed. In other words, macro blocks are restored to the original MPEG stream.

Now, a high speed reproducing operation of which pictures are reproduced from a magnetic tape that is driven at a higher speed than the recording operation will be described. In the high speed reproducing operation, a rotating head diagonally traces a plurality of helical tracks. Thus, the rotating head cannot completely trace one whole track. Consequently, when the above-described packing process is performed, if variable length code of a macro block exceeds the fixed length, the portion that exceeds the fixed length is placed in another packet. Thus, the portion cannot be restored as an original variable length code. As was described above, in the MPEG, since DCT blocks as luminance components and color difference components are arranged, when macro blocks are depacked, if data thereof is lost, for example color difference components are partly lost. Thus, a picture may be displayed in abnormal color or monochrome.

When an MPEG stream contains an error that cannot be corrected with error correction code (that will be described later), variable length code preceded by the error position in the slice cannot be decoded. Thus, as with the above-described high speed reproducing operation, the color difference components of the reproduced picture are partly lost. As a result, a picture is displayed in abnormal color or monochrome.

To solve such a problem, a method of which DC components and AC components are arranged over all DCT blocks of a macro block has been proposed. In this method, even if data packed in another packet is lost, it is high order AC component data of a DCT coefficient of each DCT block. Thus, although a high frequency component of the picture is lost, the picture quality Is not largely deteriorated.

In such a manner, macro blocks are converted and placed in packets each having a fixed length. To prevent a burst error from concentrating at a part of the picture, fixed-length packets are shuffled. The resultant data is encoded with error correction code using Reed-Solomon code and product code. A synchronous signal and additional information such as a predetermined ID are added to the data that has been shuffled and encoded with error correction code. The resultant data is a sync block that is the minimum unit of data that is recorded on a magnetic tape.

When an MPEG stream is reproduced, the error correction code is decoded corresponding to the ID that has been added when the stream is recorded. The shuffled sync blocks are restored to the sync blocks in the original order (this operation is referred to as deshuffling operation). The deshuffled data is depacked so as to restore the DCT coefficients. As a result, the MPEG stream is reproduced.

However, MPEG streams in various formats may be supplied to such a VTR. For example, as an example of a format, a chroma format is known. The chroma format represents the ratio of the sampling frequencies of a luminance signal and two color difference signals. For example, there are chroma formats 4:4:4, 4:2:2, and 4:2:0.

Broadcasting stations mainly use digital video signals in the chroma format 4:2:2. The broadcasting stations may use digital video signals in the chroma format 4:2:0. Next, it is assumed that a VTR has been designed so as to optimize a digital video signal in the chroma format 4:2:2 and that a digital video signal in the chroma format 4:2:0.

In this case, since the apparatus has been designed so as to optimize a digital video signal in the chroma format 4:2:2, a signal in the chroma format 4:2;0 should be temporarily decoded to an original video signal and then reencoded to a signal in the chroma format 4:2:2. As a result, the picture quality is inevitably deteriorated.

In addition, as was described above, when an MPEG stream is recorded, DCT coefficients are rearranged. Thus, with the apparatus optimized with a signal in the chroma format 4:2:2, if DCT coefficients in the chroma format 4:2:2 are rearranged, when the MPEG stream is reproduced, the rearranged DCT coefficients cannot be restored to correctly arranged DCT coefficients.

If arranged DCT coefficients are restored to correctly arranged DCT coefficients, each portion of the structure should be designed in consideration of the chroma formats. Thus, the structure becomes complicated and the designing steps are increased.

In addition, since the data length of the chroma format 4:2:2 is different from the data length of the chroma format 4:2:0, the difference may adversely affect the shuffling process and the error correction code encoding process that should be performed with fixed length data. When the shuffling process and the error correction code encoding process are adversely affected, it may be necessary to change the format of the VTR.

DISCLOSURE OF THE INVENTION

Therefore, an object of the present invention is to provide a recording apparatus, a recording method, a reproducing apparatus, and a reproducing method that can record and/or reproduce MPEG streams in the chroma formats 4:2:2 and 4:2:0 without need to recognize their differences.

To solve the above-described problem, the present invention is a recording apparatus for recording to a record medium a digital video signal of which a screen is divided into first blocks in a predetermined manner, a luminance signal and two color difference signals of each first block being divided into second blocks corresponding to a chroma format based on the ratio of sampling frequencies of the luminance signal and the two color difference signals, in the digital video signal, the luminance signal and the two color difference signals having been compression-encoded for each second block, the recording apparatus, comprising a detecting means for detecting a first chroma format that represents the ratio of sampling frequencies of the luminance signal and the two color difference signals of an input digital video signal, and a controlling means for stopping a process for the input digital video signal in a period corresponding to the difference between a predetermined information amount represented by a second chroma format and the information amount represented by the first chroma format when the information amount represented by the first chroma format is smaller than the information amount of the second chroma format corresponding to the first chroma format detected by the detecting means.

In addition, the present invention is a recording method for recording to a record medium a digital video signal of which a screen is divided into first blocks in a predetermined manner, a luminance signal and two color difference signals of each first block being divided into second blocks corresponding to a chroma format based on the ratio of sampling frequencies of the luminance signal and the two color difference signals, in the digital video signal, the luminance signal and the two color difference signals having been compression-encoded for each second block, the recording method, comprising the steps of detecting a first chroma format that represents the ratio of sampling frequencies of the luminance signal and the two color difference signals of an input digital video signal, and stopping a process for the input digital video signal in a period corresponding to the difference between a predetermined information amount represented by a second chroma format and the information amount represented by the first chroma format when the information amount represented by the first chroma format is smaller than the information amount of the second chroma format corresponding to the first chroma format detected at the detecting step.

In addition, the present invention is a reproducing apparatus for reproducing from a record medium a digital video signal of which a screen is divided into first blocks in a predetermined manner, a luminance signal and two color difference signals of each first block being divided into second blocks corresponding to a chroma format based on the ratio of sampling frequencies of the luminance signal and the two color difference signals, in the digital video signal, the luminance signal and the two color difference signals having been compression-encoded for each second block, the reproducing apparatus, comprising a reproducing means for reproducing the digital video signal recorded on the record medium, a detecting means for detecting a first chroma format that represents the ratio of sampling frequencies of the luminance signal and the two color difference signals of the digital video signal reproduced by the reproducing means, and a controlling means for stopping a process for the reproduced digital video signal in a period corresponding to the difference between a predetermined information amount represented by a second chroma format and the information amount represented by the first chroma format when the information amount represented by the first chroma format is smaller than the information amount of the second chroma format corresponding to the first chroma format detected by the detecting means.

In addition, the present invention is a reproducing method for reproducing from a record medium a digital video signal of which a screen is divided into first blocks in a predetermined manner, a luminance signal and two color difference signals of each first block being divided into second blocks corresponding to a chroma format based on the ratio of sampling frequencies of the luminance signal and the two color difference signals, in the digital video signal, the luminance signal and the two color difference signals having been compression-encoded for each second block, the reproducing method, comprising the steps of reproducing the digital video signal recorded on the record medium, detecting a first chroma format that represents the ratio of sampling frequencies of the luminance signal and the two color difference signals of the digital video signal reproduced at the reproducing step, and stopping a process for the reproduced digital video signal in a period corresponding to the difference between a predetermined information amount represented by a second chroma format and the information amount represented by the first chroma format when the information amount represented by the first chroma format is smaller than the information amount of the second chroma format corresponding to the first chroma format detected at the detecting step.

Claims 1 and 5 are a recording apparatus and a recording method for recording to a record medium a digital video signal of which a screen is divided into first blocks in a predetermined manner, a luminance signal and two color difference signals of each first block being divided into second blocks corresponding to a chroma format based on the ratio of sampling frequencies of the luminance signal and the two color difference signals, in the digital video signal, the luminance signal and the two color difference signals having been compression-encoded for each second block, the recording apparatus and reproducing method, comprising the steps of detecting a first chroma format that represents the ratio of sampling frequencies of the luminance signal and the two color difference signals of an input digital video signal, and stopping a process for the input digital video signal in a period corresponding to the difference between a predetermined information amount represented by a second chroma format and the information amount represented by the first chroma format when the information amount represented by the first chroma format is smaller than the information amount of the second chroma format corresponding to the detected first chroma format. Thus, a digital video signal in a first chroma format can be processed at the same timing as a second chroma format.

Claims 6 and 10 are a reproducing apparatus and a recording method for reproducing from a record medium a digital video signal of which a screen is divided into first blocks in a predetermined manner, a luminance signal and two color difference signals of each first block being divided into second blocks corresponding to a chroma format based on the ratio of sampling frequencies of the luminance signal and the two color difference signals, in the digital video signal, the luminance signal and the two color difference signals having been compression-encoded for each second block, the reproducing apparatus and reproducing method, comprising the steps of reproducing the digital video signal recorded on the record medium, detecting a first chroma format that represents the ratio of sampling frequencies of the luminance signal and the two color difference signals of the reproduced digital video signal, and stopping a process for the reproduced digital video signal in a period corresponding to the difference between a predetermined information amount represented by a second chroma format and the information amount represented by the first chroma format when the information amount represented by the first chroma format is smaller than the information amount of the second chroma format corresponding to the detected first chroma format. Thus a digital video signal corresponding to a first ratio of sampling frequencies can be processed at the same timing as a second ratio of sampling frequencies.

BRIEF DESCRIPTION OF DRAWINGS

FIG. 1 is a schematic diagram showing the hierarchical structure of data of MPEG2 ;

FIG. 2 is a schematic diagram showing the contents of data placed in an MPEG2 stream and bit assignments thereof;

FIG. 3 is a schematic diagram showing the contents of data placed in an MPEG2 stream and bit assignments thereof;

FIG. 4 is a schematic diagram showing the contents of data placed in an MPEG2 stream and bit assignments thereof;

FIG. 5 is a schematic diagram showing the contents of data placed in an MPEG2 stream and bit assignments thereof;

FIG. 6 is a schematic diagram showing the contents of data placed in an MPEG2 stream and bit assignments thereof;

FIG. 7 is a schematic diagram showing the contents of data placed in an MPEG2 stream and bit assignments thereof;

FIG. 8 is a schematic diagram showing the contents of data placed in an MPEG2 stream and bit assignments thereof;

FIG. 9 is a schematic diagram showing the contents of data placed in an MPEG2 stream and bit assignments thereof;

FIG. 10 is a schematic diagram showing the contents of data placed in an MPEG2 stream and bit assignments thereof;

FIG. 11 is a schematic diagram showing the contents of data placed in an MPEG2 stream and bit assignments thereof;

FIG. 12 is a schematic diagram showing the contents of data placed in an MPEG2 stream and bit assignments thereof;

FIG. 13 is a schematic diagram for explaining an arrangement of bytes of data;

FIG. 14 is a schematic diagram showing in reality a header of an MPEG stream according to an embodiment;

FIG. 15 is a block diagram showing an example of the structure of a recording and reproducing apparatus according to the embodiment;

FIG. 23 is a schematic diagram for explaining the effects of the rearrangement of coefficients and packing thereof;

FIG. 25 is a block diagram showing a more practical structure of an ECC encoder;

FIG. 32 is a schematic diagram showing the relation between chroma_format and a chroma format of a video signal;

BEST MODES FOR CARRYING OUT THE INVENTION

Figure 16A:
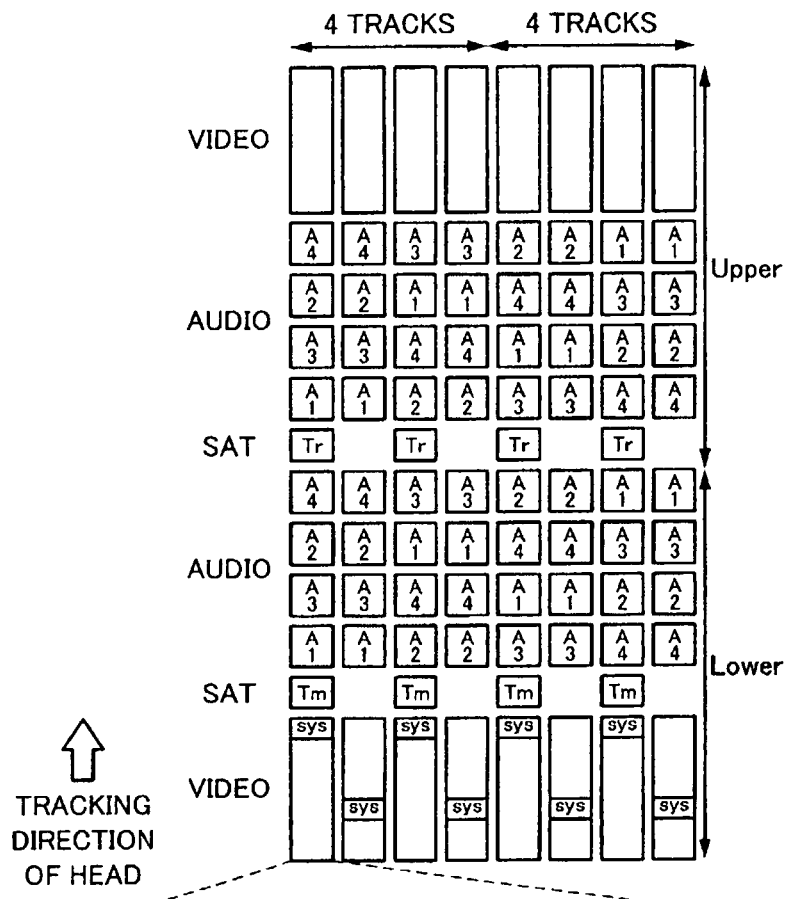
FIG. 16 is a schematic diagram showing an example of a format of tracks formed on a magnetic tape.

Next, an embodiment of the present invention will be described. The embodiment is applied to a digital VTR. The embodiment is suitable for the environment of a broadcasting station.

According to the embodiment, for example MPEG2 is used as a compression formation. The MPEG2 is a combination of a motion compensation predictive encoding and a compression encoding using DCT. MPEG2 data is hierarchically structured. As shown in FIG. 1, MPEG2 data is composed of a macro block layer (FIG. 1E) as the lowest layer, a slice layer (FIG. 1D), a picture layer (FIG. 1C), a GOP layer (FIG. 1B), and a sequence layer (FIG. 1A) as the highest layer.

As shown in FIG. 1E, the macro block layer is composed of DCT blocks each of which is a data unit for DCT. The macro block layer is composed of a macro block header and a plurality of DCT blocks. As shown in FIG. 1D, the slice layer is composed of a slice header portion and at least one macro block. As shown in FIG. 1C, the picture layer is composed of a picture header portion and at least one slice. One picture corresponds to one screen. As shown in FIG. 1B, the GOP layer is composed of a GOP header portion, an I picture, a P picture, and a B picture. The I picture is a picture that has been intra-frame encoded. The P and B pictures are pictures that have been predictively encoded.

The I picture (Intra-coded picture) uses information of only a picture that is encoded. Thus, the I picture can be decoded as it is. The P picture (Predictive-coded picture) uses an I picture or a P picture that has been decoded before the current P picture is decoded. The difference between the current P picture and the motion compensated predictive picture is encoded or the current P picture is encoded without the difference. One of them is selected for each macro block depending on which is more effective. The B picture (Bidirectionally predictive-coded picture) uses (1) an I picture or a P picture that has been decoded before the current B picture is decoded, (2) an I picture or a P picture that has been decoded before the current B picture is decoded, or (3) an interpolated picture of (1) and (2). The difference between the current B picture and each of the three types of the motion compensated predictive pictures is encoded or the current B picture is encoded without the difference. One of them is selected for each macro block depending on which is the most effective.

Thus, as types of macro blocks, there are an intra-frame encoded macro block, a forward inter-frame predictive macro block of which a future macro block is predicted with a past macro block, a backward interframe predictive macro block of which a past macro block is predicted with a future macro block, and a bidirectional macro block that is predicted in both the forward and backward directions. All macro blocks in an I picture are all intra-frame macro blocks. A P picture contains an intra-frame macro block and a forward inter-frame predictive macro block. A B picture contains all the four types of macro blocks.

A GOP contains at least one I picture. However, a GOP may contain neither a P picture nor a B picture. As shown in FIG. 1A, the sequence layer as the highest layer is composed of a sequence header portion and a plurality of GOPs.

In the MPEG format, one slice is one variable length code sequence. The variable length code sequence is a sequence of which the boundary of data cannot be detected unless variable length code is correctly decoded.

At the beginning of each of the sequence layer, the GOP layer, the picture layer, and the slice layer, a start code is placed. The start code is a predetermined bit pattern composed of bytes. The start code differs in each of the layers. Particularly, in the sequence layer, the start code is referred to as sequence header code. In each of the other layers, the start code is just referred to as start code. Each start code has a bit pattern of [00 00 01 xx] (where [ ] represents a hexadecimal notation). Thus, the bit pattern has four set of two digits. In addition, [xx] represents that each layer has a unique bit pattern.

In other words, each of the start codes and the sequence header code is composed of four bytes (=32 bits). Corresponding to the value of the fourth byte, the type of information that follows is identified. Since each of the start codes and the sequence header code is arranged in bytes, they can be acquired by matching a pattern of four bytes.

The high order four bits of one byte preceded by the start code is an identifier the represents the content of an extension data area (that will be described later). Corresponding to the value of the identifier, the content of the extension data can be identified.

Each DCT block in the macro block layer or each DCT block in each macro block does not have an identification code having a predetermined bit pattern arranged in bytes.

Next, the header portion of each layer will be described in detail. In the sequence layer shown in FIG. 1A, at the beginning, a header 2 is placed. The header 2 is followed by a sequence extension 3 and extension and user data 4. At the beginning of the sequence header 2, a sequence header code 1 is placed. Likewise, at the beginning of each of the sequence extension 3 and the user data 4, a predetermined start code (not shown) is placed. The area from the sequence header 2 to the extension and user data 4 is a header portion of the sequence layer.

FIG. 2 shows contents and assigned bits of the sequence header 2. As shown in FIG. 2, the sequence header 2 contains sequence header code 1, encoded picture size (composed of the number of pixels in horizontal direction and the number of lines in vertical direction), aspect ratio, frame rate, bit rate, VBV (Video Buffering Verifier) buffer size, and quantizing matrix that are designated for each sequence with the designated numbers of bits.

As shown in FIG. 3, the sequence extension 3 preceded by the extension start code preceded by the sequence header designates additional data used in MPEG2. The addition data is for example profile, level, chroma (color difference) format, and progressive sequence. As shown in FIG. 4, the extension and user data 4 contains sequence indication ( ) and sequence scalable extension ( ). The sequence indication ( ) contains information of RGB conversion characteristic of an original signal and display screen size. The sequence scalable extension ( ) designates a scalability mode and the layer of scalability.

The header portion of the sequence layer is followed by GOPs. As shown in FIG. 1B, at the beginning of each GOP, GOP header 6 and user data 7 are placed. The GOP header 6 and the user data 7 are a header portion of each GOP. As shown in FIG. 5, the GOP header 6 contains start code 5, time code, and flags representing independency and validity of the GOP with the designated numbers of bits. As shown in FIG. 6, the user data 7 contains extension data and user data. At the beginning of each of the extension data and the user data, predetermined start code (not shown) is placed.

The header portion of the GOP layer is followed by pictures. As shown in FIG. 1C, at the beginning of each picture, picture header 9, picture encoding extension 10, and extension and user data 11 are placed. At the beginning of the picture header 9, picture start code 8 is placed. At the beginning of each of the picture encoding extension 10 and the extension and user data 11, a predetermined start code is placed. The area from the picture header 9 to the user data 11 is a header portion of each picture.

As shown in FIG. 7, the picture header 9 contains picture start code 8. In addition, in the picture header 9, encoding condition for a screen is designated. As shown in FIG. 8, in the picture encoding extension 10, the range of a moving vector in the forward, backward, and horizontal/vertical directions is designated. In addition, the picture structure is designated. In the picture encoding extension 10, the accuracy of DC coefficients of an intra-macro block is designated; the VLC type is selected; the linear/non-linear quantizing scale is selected; and the scanning method in DCT is selected.

As shown in FIG. 9, in the extension and user data 11, quantizing matrix, spatial scalable parameter, and so forth are designated. They can be designated for each picture. Thus, a picture can be encoded corresponding to characteristics of each screen. Moreover, in the extension and user data 11, the picture display area can be designated. Furthermore, in the extension and user data 11, copyright information can be designated.

The header portion of the picture layer is followed by slices. As shown in FIG. 1D, at the beginning of each slice, slice header 13 is placed. At the beginning of the slice header 13, slice start code 12 is placed. As shown in FIG. 10, the slice start code 12 includes position information in the vertical direction of the current slice. In addition, the slice header 13 contains extended slice vertical position information, quantizing scale information, and so forth.

The header portion of the slice layer is followed by macro blocks (see FIG. 1E). Each macro block contains a macro block header 14 and a plurality of DCT blocks. As was described above, the macro block header does not contain a start code. As shown in FIG. 11, the macro block header 14 contains relative position information of the current macro block. In addition, in the macro block header 14, motion compensation mode and detail information about DCT encoding are designated.

The macro block header 14 is followed by DCT blocks. As shown in FIG. 12, each DCT block contains variable-length code encoded DCT coefficients and data about DCT coefficients.

In FIG. 1, solid line partitions of each layer represent that data is arranged in bytes, whereas dotted line partitions thereof represent that data is not arranged in bytes. In other words, as shown in FIG. 13A, in higher layers up to the picture layer, the boundary of code is delimited in bytes. On the other hand, in the slice layer, only the slice start code 12 is delimited in bytes. As shown in FIG. 13B, each macro block can be delimited in bits. Likewise, in the macro block layer, each DCT block can be delimited in bits.

On the other hand, to prevent a signal from being deteriorated in a decoding and an encoding, it is preferred to edit encoded data. At that point, when a P picture and a B picture are decoded, a picture that is chronologically preceded by the current picture or pictures that are chronologically preceded and followed by the current picture are required. Thus, the editing cannot be performed in each frame. In consideration of that point, according to the embodiment, one GOP is composed of only one I picture.

In addition, record data of for example one frame is recorded at a predetermined position. In the MPEG2, since variable length encoding is used, the amount of data for one frame is controlled so that data generated in one frame period can be recorded to a predetermined record area. In addition, according to the embodiment, so that MPEG2 data can be properly recorded to a magnetic tape, one slice is composed of one macro block. Moreover, one macro block is packed to a predetermined fixed length.

FIG. 14 shows the headers of an MPEG stream according to the embodiment in reality. As is clear from FIG. 1, at the beginnings of the sequence layer, the GOP layer, the picture layer, the slice layer, and the macro block layer, the headers are placed. FIG. 14 shows an example of a data arrangement starting with the sequence header portion.

At the beginning, sequence header 2 having the length of 12 bytes is placed. The sequence header 2 is followed by sequence extension 3 having the length of 10 bytes. The sequence extension 3 is followed by extension and user data 4. At the beginning of the extension and user data 4, user data start code having the length of four bytes is placed. The user data start code is followed by user data area. The user data area contains information corresponding to SMPTE standard.

The header portion of the sequence layer is followed by a header portion of the GOP layer. The header portion contains GOP header 6 having the length of eight bytes. The GOP header 6 is followed by extension and user data 7. At the beginning of the extension and user data 7, user data start code having the length of four bytes is placed. The user data start code is followed by user data area. The user data area contains information necessary for having compatibility with another conventional video format.

The header portion of the GOP layer is followed by header portion of the picture layer. The picture portion contains picture header 9 having the length of nine bytes. The picture header 9 is followed by picture encoding extension 10 having the length of nine bytes. The picture encoding extension 10 is followed by extension and user data 11. The first 133 bytes of the extension and user data 11 is extension and user data. The extension and user data is followed by user data start code 15 having the length of four bytes. The user data start code 15 is followed by information necessary for having compatibility with another conventional video format. The information is followed by user data start code 16. The user data start code 16 is followed by data corresponding to SMPTE standard. The header portion of the picture layer is followed by slices.

Next, a macro block will be further described. Each macro block contained in the slice layer is a set of a plurality of DCT blocks. An encoded sequence of DCT blocks is composed of sets of runs and levels. A run represents the number of 0's as a quantized DCT coefficient. A level is immediately preceded by a run. A level represents a non-zero value as a quantized DCT coefficient. Neither each macro block nor each DCT block contained in each macro block does not contain identification code arranged in bytes.

A macro block is formed by dividing one screen (picture) into a lattice of 16 pixels×16 lines. A slice is formed by connecting macro blocks for example in the horizontal direction. The last macro block of one slice is continued to the first macro block of the next slice. Macro blocks between two slices are prohibited from being overlapped. The number of macro blocks per one screen depends on the size thereof.

The number of macro blocks in the vertical direction of a screen is referred to as mb_height, whereas the number of macro blocks in the horizontal direction of a screen is referred to as mb_width. The coordinates of a macro block are defined as mb_height and mb_column. mb_height is the vertical position number of the current macro block counted from the upper edge of the screen, the upper edge being 0. mb_column is the horizontal position number of the current macro block counted from the left edge of the screen, the left edge being 0. The position of a macro block on the screen is represented with one variable as macroblock_address=mb_row×mb_width+mb_column.

The order of slices and macro blocks of a stream is defined with macroblock_address. In other words, a stream is transmitted in the downward direction and leftward direction of the screen.

In the MPEG, normally, one slice is composed of one stripe (16 lines). The variable length encoding starts at the left edge of the screen and ends at the right edge of the screen. Thus, when a VTR has recorded an MPEG elementary stream, if it is reproduced at high speed, the VTR mainly reproduces the left edge of the screen. Thus, the screen cannot be equally updated. In addition, since the position on the tape cannot be predicted, if a tape pattern is traced at predetermined intervals, the screen cannot be equally updated. Moreover, if at least one error takes place, it adversely affects until the right edge of the screen. Thus, until the next slice header is detected, the error continues. Consequently, one slice is composed of one macro block.

FIG. 15 shows an example of the structure of a recording and reproducing apparatus according to the embodiment of the present invention. When the recording operation is performed, a digital signal is input from a terminal 100. The digital signal is supplied to an SDI (Serial Data Interface) receiving portion 101. The SDI is an interface defined by SMPTE so that a component video signal, a digital audio signal, and additional data can be transmitted. The SDI receiving portion 101 extracts a digital video signal and a digital audio signal from the input digital signal. The digital video signal is supplied to a MPEG encoder 102. The digital audio signal is supplied to an MPEG encoder 109 through a delay 103. The delay 103 absorbs the time difference between the digital audio signal and the digital video signal.

In addition, the SDI receiving portion 101 extracts a synchronous signal from the input digital signal. The extracted synchronous signal is supplied to a timing generator 104. Alternatively, an external synchronous signal may be input from a terminal 105 to the timing generator 104. The timing generator 104 generates timing pulses corresponding to a designated signal of the input synchronous signal and a synchronous signal supplied from a SDTI receiving portion 108 (that will be described later). The generated timing pulses are supplied to each portion of the recording and reproducing apparatus.

The MPEG encoder 102 performs a DCT (Discrete Cosine Transform) process for the input video signal so as to transform the input video signal into coefficient data and then encode the coefficient data with variable-length code. The variable-length code encoded data (VLC) data is an elementary stream (ES) corresponding to the MPEG2. The output is supplied to one of input terminals of a record side multiformat converter (referred to as MFC) 106.

On the other hand, data in SDTI (Serial Data Transport Interface) format is input from an input terminal 107. The signal is synchronously detected by an SDTI receiving portion 108. Thereafter, the signal is buffered in a frame memory 170 and then the elementary stream is extracted therefrom. The read timing of the extracted elementary stream is controlled with signal ready that is supplied from the read side MFC 106. At the read timing, the extracted elementary stream is read from the frame memory 170. The read elementary stream is supplied to another input terminal of the record side MFC 106. The synchronous signal that has been synchronously detected by the SDTI receiving portion 108 is supplied to the above-described timing generator 104.

According to the embodiment, to transmit an MPEG ES (MPEG elementary stream), for example SDTI (Serial Data Transport Interface)-CP (Content Package) is used. The ES is 4:2:2 components. In addition, the ES is a stream composed of only I pictures. Moreover, the ES has the relation of 1 GOP=1 picture. In the SDTI-CP format, the MPEG ES is separated into access units and packed to packets corresponding to frames. In the SDTI-CP format, a sufficient transmission band (27 MHz or 36 MHz of clock rate or 270 Mbps or 360 Mbps of stream bit rate. Thus, in one frame period, the ES can be transmitted as a burst.

In the area after SAV until EAV of one frame period, system data, video stream, audio stream, and AUX data are placed. Data is not equally placed in the entire frame period. Instead, in a predetermined period from the beginning, data is placed as a burst. At the boundary of a frame, an SDTI-CP stream (video and audio) can be switched in the form of a stream. In the SDTI-CP format, when contents use SMPTE time code corresponding to the clock, audio is synchronized with video. In addition, it is defined that SDTI-CP and SDI coexist.

As in the case that a TS (Transport Stream) is transferred, the above-described interface corresponding to the SDTI-CP format does not need to cause an SDTI-CP steam to flow to a VBV (Video Buffer Verifier) buffer and TBs (Transport Buffers) of the encoder and the decoder. Thus, the delay of the stream can be decreased. In addition, since the SDTI-CP format allows a stream to be transferred at very high rate, the delay can be further decreased. Thus, in an environment of which there is a synchronization in the entire broadcasting station, the SDTI-CP format can be effectively used.

The SDTI receiving portion 108 further extracts a digital audio signal from the input SDTI-CP stream. The extracted digital audio signal is supplied to the MPEG encoder 109.

The record side MFC 106 contains a selector and a stream converter. When the operation mode of the record side MFC 106 is switched, it can be used as a reception side MFC 114 (that will be described later). Next, the process performed by the record side MFC 106 will be described. An MPEG ES supplied from the MPEG encoder 102 or an MPEG ES supplied from the SDTI receiving portion 108 is selected by the selector. The selected MPEG stream is supplied to the stream converter.

The stream converter rearranges DCT coefficients of individual DCT blocks of one macro block arranged corresponding to the MPEG2 standard to DCT coefficients over all DCT blocks corresponding to frequency components. In addition, when one slice of an elementary stream is composed of one stripe, the stream converter converts the elementary stream so that one slice is composed of one macro block. Moreover, the stream converter limits the maximum length of the variable length data that takes place in one macro block to a predetermined length. This process is performed by designating 0 to high order DCT coefficients.

As will be described later, the stream converter detects the sequence extension 3 preceded by the sequence header 2 of the supplied MPEG ES and extracts chroma_format that is information representing the chroma format from the sequence extension 3. Corresponding to the extracted chroma format information, the stream converter controls the process timing of the input MPEG ES so that both the chroma formats 4:2:2 and 4:2:0 can be processed in common.

The converted elementary stream rearranged by the record side MFC 106 is supplied to the ECC encoder 109. A main memory having a large storage capacity (not shown) is connected to the ECC encoder 109. The MPEG encoder 109 comprises a packing and shuffling portion, an audio outer code encoder, a video outer code encoder, an inner code encoder, an audio shuffling portion, a video shuffling portion, and so forth. The ECC encoder 109 comprises an ID adding circuit and a synchronous signal adding circuit. The ID adding circuit adds an ID to each sync block. The ECC encoder 109 is composed of for example one integrated circuit.

According to the embodiment, error correction code used for video data and audio data is product code of which the video data or audio data is encoded with outer code in the vertical direction of a two dimensional array and the video data or audio data is encoded with inner code in the horizontal direction of the two dimensional array. Thus, with the product code, data symbols are dually encoded. As the outer code and inner code, Reed-Solomon code can be used.

Next, the process performed by the ECC encoder 109 will be described. Since video data of a converted elementary stream has been encoded with variable length code, the data length of each macro block varies. The packing and shuffling portion packs each macro block in a fixed length. When a macro block cannot be packed in the fixed length, the overflow portion is packed to other areas that have spaces against the fixed length.

In addition, system data containing information about picture format, version of shuffling pattern, and so forth is supplied from a system controller 121 (that will be described later). The system data is input from an input terminal (not shown). The system data is supplied to the packing and shuffling portion. The packing and shuffling portion performs a record process for the system data as with picture data. The system data is recorded as video AUX. In addition, the packing and shuffling portion rearranges macro blocks of one frame that are generated in the scanning order and performs a shuffling process for dispersing the record positions of the macro blocks on the tape. Since the macro blocks are shuffled, even if data is partly reproduced when it is reproduced at high speed, the update ratio of the picture can be improved.

The video data and system data supplied from the packing and shuffling portion (unless otherwise specified, even if video data contains system data, the video data is simply referred to as video data) is supplied to the video outer code encoder that encodes video data with outer code. The video outer code encoder adds an outer code parity to the video data. An output of the outer code encoder is supplied to the video shuffling portion. The video shuffling portion performs a shuffling process for the output of the outer code encoder so as to change the order of sync blocks over a plurality of ECC blocks. Since sync blocks are shuffled, an error can be prevented from concentrating on a particular ECC block. The shuffling process performed by the shuffling portion may be referring to interleave. An output of the video shuffling portion is written to the main memory.

On the other hand, as was described above, a digital audio signal that is output from the SDTI receiving portion 108 or the delay 103 is supplied to the ECC encoder 109. According to the embodiment, non-compressed digital audio signal is handled. Alternatively, the digital audio signal may be input through an audio interface. In addition, audio AUX is supplied from an input terminal (not shown). The audio AUX is auxiliary data that contains information about audio data such as sampling frequency. The audio AUX is added to audio data and treated in the same manner as audio data.

Audio data to which the audio AUX has been added (unless otherwise specified, referred to as audio data) is supplied to the audio outer code encoder that encodes audio data with outer code. An output of the audio outer code encoder is supplied to an audio shuffling portion. The audio shuffling portion shuffles the audio data. The audio shuffling portion shuffles the audio data for each sync block and for each channel.

An output of the audio shuffling portion is written to a main memory. As was described above, the output of the video shuffling portion is also written to the main memory. The main memory mixes the audio data and the video data as data of one channel.

Data is read from the main memory. An ID that represents information of a sync block number is added to the data. The resultant data is supplied to the inner code encoder. The inner code encoder encodes the supplied data with inner code. A synchronous signal is added to an output of the inner code encoder for each sync block. As a result, record data as successive sync blocks is formed.

Record data that is output from the ECC encoder 109 is supplied to an equalizer 110 that includes a recording amplifier and so forth. The equalizer 110 converts the supplied data into a record RF signal. The record RF signal is supplied to a rotating drum 111 on which a rotating head is disposed at a predetermined position and then recorded on the magnetic tape 112. In reality, a plurality of magnetic heads are disposed in such a manner that azimuths of heads that form adjacent tracks are different.

When necessary, a scrambling process may be performed for the record data. When digital data is recorded, it may be digitally modulated. Moreover, partial response class 4 and Viterbi encoding may be used. The equalizer 110 contains both the structure for the record side and the structure for the reproduction side.

FIG. 16 shows an example of the format of tracks formed on a magnetic tape by the above-described rotating head. In the example, video data and audio data for one frame are recorded with four tracks. Two tracks having different azimuths form one segment. In other words, four tracks are composed of two segments. One set of tracks that compose one segment is assigned track numbers [0] and [1] corresponding to azimuths. Video sectors are formed on both edge sides of each track. In the video sectors, video data is recorded. Audio sectors are formed between the video sectors. In the audio sectors, audio data is recorded. FIG. 16 shows the positions of the sectors on the tape.

In the example, audio data of four channels can be handled. In FIG. 16A, A1 to A4 represent channels 1 to 4 of audio data, respectively. Audio data is recorded in such a manner that the arrangement of audio data is changed in each segment. In the example, video data for four error correction blocks per track is interleaved. The interleaved data is divided into an upper side sector and a lower side sector and recorded.

The lower side video sector has a system area (SYS) at a predetermined position. The system area is alternately formed on the beginning side and the end side of the lower side video sector of each track.

In FIG. 16, SAT is an area in which a servo lock signal is recorded. Between each area, a gap having a predetermined size is formed.

In FIG. 16, data for each frame is recorded with four tracks. Depending on the format of data that is recorded and reproduced, data for each frame may be recorded with eight tracks per frame, six tracks per frame, and so forth.

Figure 16B:
Figure 16C:
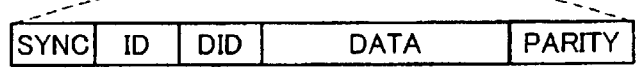

As shown in FIG. 16B, data recorded on the tape is composed of a plurality of blocks formed at equal intervals. These blocks are referred to as sync blocks. FIG. 16C shows an outline of the structure of a sync block. A sync block is composed of sync pattern, ID, DID, data packet, and error correction inner code parity. The SYNC pattern is used to detect synchronization. The ID is used to identify the current sync block. The DID is used to represent the content of data that follows. Data is treated as packets corresponding to sync blocks. In other words, the minimum unit of data that is recorded or reproduced is one sync block. Many sync blocks (see FIG. 16B) compose for example a video sector.

Returning to the description of FIG. 15, when a signal is reproduced from the magnetic tape 112, the signal reproduced from a magnetic tape 112 by the rotating drum 111 is supplied to a reproduction side structure of the equalizer 110 that includes a reproducing amplifier. The equalizer 110 performs an equalizing process, a waveform trimming process, and so forth for the reproduced signal. When necessary, the equalizer 110 performs a demodulating process, a Viterbi decoding process, and so forth for the reproduced signal. An output of the equalizer 110 is supplied to an ECC decoder 113.

The ECC decoder 113 performs the reverse process of the ECC encoder 109. The ECC decoder 113 comprises a main memory, an inner code decoder, an audio deshuffling portion, a video deshuffling portion, and an outer code decoder. The main memory has a large storage capacity. The ECC decoder 113 comprises a video deshuffling and depacking portion and a video data interpolating portion. Likewise, the ECC decoder 113 comprises an audio AUX separating portion -and an audio data interpolating portion. The ECC decoder 113 is composed of for example one integrated circuit.

Next, the process performed by the ECC decoder 113 will be described. The ECC decoder 113 detects synchronization. In other words, the ECC decoder 113 detects a synchronous signal added at the beginning of a sync block and extracts a sync block. Each sync block of the reproduction data is supplied to the inner code decoder. The inner code decoder corrects an error of a sync block with inner code. For an output of the inner code decoder, an ID interpolating process is performed. The ID (for example, the sync block number) of a sync block from which an error is detected with inner code is interpolated. The resultant reproduced data is separated into video data and audio data.

As was described above, the video data represents both DCT coefficient data generated in the MPEG intra-encoding process and system data. Likewise, the audio data represents PCM (Pulse Code Modulation) data and audio AUX.

The separated audio data is supplied to the audio deshuffling portion. The audio deshuffling portion performs the reverse process of the shuffling process performed by the record side shuffling portion. An output of the deshuffling portion is supplied to the audio outer code decoder. The outer code decoder corrects an error of the audio data with outer code. The audio outer code decoder outputs error-corrected audio data. When an error of audio data cannot be corrected, an error flag is set.

An output of the audio outer code decoder is supplied to the audio AUX separating portion. The audio AUX separating portion separates audio AUX from the audio data that is output from the audio outer code decoder. The separated audio AUX is output from the ECC decoder 113 (the route is not shown). The audio AUX is supplied to the system controller 121 mentioned later. The audio AUX is supplied to the data interpolating portion. The data interpolating portion interpolates a sample containing an error. The interpolating method is for example average value interpolating method, preceding value hold method, or the like. In the average value interpolating method, a sample containing an error is interpolated with an earlier correct sample and a later correct sample. In the preceding value hold method, a preceding correct value is held.

An output of the data interpolating portion is an output of audio data that is output from the ECC decoder 113. The audio data that is output from the ECC decoder 113 is supplied to a delay 117 and an SDTI output portion 115. The delay 117 absorbs the delay in the process for video data performed in an MPEG decoder 116 (that will be described later). The delay 117 delays the audio data by a predetermined time period and supplies the delayed audio data to an SDI output portion 118.

The separated video data is supplied to the deshuffling portion. The deshuffling portion performs the reverse process of the shuffling process performed by the record side shuffling portion. The deshuffling portion restores the sync blocks shuffled by the record side shuffling portion to the original sync blocks. An output of the deshuffling portion is supplied to the outer code decoder. The outer code decoder corrects an error of each sync block with outer code. When an uncorrectable error takes place, an error flag that represents that there is an error is set.

An output of the outer code decoder is supplied to the deshuffling and depacking portion. The deshuffling and depacking portion restores macro blocks shuffled by the record side packing and shuffling portion to the original macro blocks. In addition, the deshuffling portion and depacking portion depacks packed macro blocks. In other words, the deshuffling portion and depacking portion restores fixed length code of each macro block to the original variable length code. In addition, the deshuffling and depacking portion separates the system data from the video data. The system data is output from the ECC decoder 113 and supplied to a system controller 121 (that will be described later).

An output of the deshuffling and depacking portion is supplied to the data interpolating portion. The data interpolating portion corrects data to which an error flag has been set (namely, data having an error). In other words, before the conversion is performed, if macro block data has an error, DCT coefficients of frequency components after the position of the error cannot be corrected. In such a case, the variable length code data at the position of the error is substituted with block end code (EOB). Variable length code of high order frequency components preceded by the block end code is discarded. Likewise, when video data is reproduced at high speed, only DCT coefficients corresponding to the sync block length are restored. The other coefficients are substituted with zero data. In addition, the data interpolating portion performs a header recovering process for a header at the beginning of video data (sequence header, GOP header, picture header, user data, and so forth) when the header has an error.

Since DCT coefficients are arranged from DC components to higher frequency components over all DCT blocks, even if DCT coefficients after a particular point are omitted, DC components and lower frequency components can be equally placed in individual DCT blocks that compose a macro block.

Video data and an error flag that are output from the data interpolating portion of the ECC decoder 113 are supplied as outputs of the ECC decoder 113. The outputs of the ECC decoder 113 are supplied to a reproduction side multi-format converter (hereinafter abbreviated to reproduction side MFC) 114. The reproduction side MFC 114 performs the reverse process of the above-described record side MFC 106. The reception side MFC 114 includes a stream converter. The reception side MFC 114 is composed of for example one integrated circuit.

The stream converter performs the reverse process of the record side stream converter. In other words, the stream converter rearranges DCT coefficients arranged over a plurality of DCT blocks corresponding to frequency components to DCT coefficients in each DCT block. In addition, the reception side MFC 114 detects the sequence extension 3 from the supplied stream and extracts information of the chroma format from the sequence extension 3. The stream converter rearranges the above-described DCT coefficients at a predetermined timing corresponding to the information of the chroma format. Thus, the reproduced signal is converted into an MPEG2 elementary stream.

As with the record side, the input and output of the stream converter should have a sufficient transmission rate (band width) corresponding to the maximum length of macro blocks. When the length of each macro block (slice) is not limited, it is preferred to secure the band width three time larger than the pixel rate.

An output of the stream converter of the reception side MFC 114 is an output of the reception side MFC 114. The output of the reception side MFC 114 is supplied to the SDTI output portion 115 and the MPEG decoder 116.

The MPEG decoder 116 decodes the elementary stream and outputs video data. In other words, the MPEG decoder 116 performs an inverse quantizing process and an inverse DCT process. The decoded video data is supplied to the SDI output portion 118. As described above, the audio data that has been separated from the vide data by the ECC decoder 113 is supplied to the SDI output portion 118 through the delay 117. The SDI output portion 118 maps the supplied video data and audio data in the SDI format and outputs a stream having the data structure of the SDI format. The stream is output from the SDI output portion 118 to the outside through an output terminal 120.

On the other hand, the audio data separated from the video data by the ECC decoder 113 is supplied to the SDTI output portion 115. The SDTI output portion 115 maps the video data and audio data to the SDTI format so as to converts them to a stream having a data structure of the SDTI format. The converted stream is output to the outside through an output terminal 119.

In FIG. 15, the system controller 121 is composed of for example a micro computer. The system controller 121 controls the entire operations of the recording and reproducing apparatus. A servo 122 communicates with the system controller 121 so as to control the traveling of the magnetic tape 112 and the driving of the rotating drum 111.

Figure 17A:
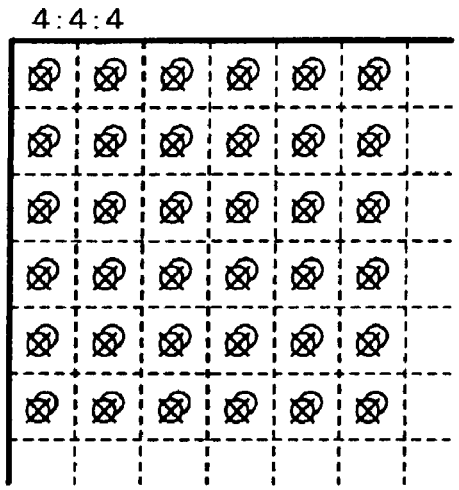
FIG. 17 is a schematic diagram for explaining a chroma format.
Figure 17B:
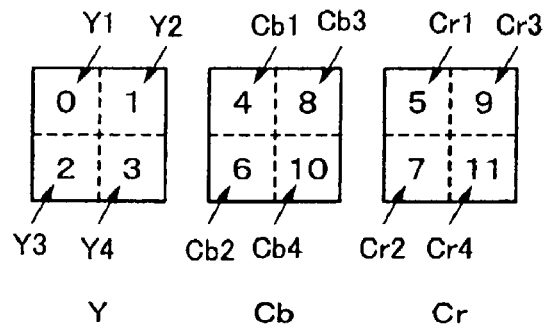
Figure 18A:
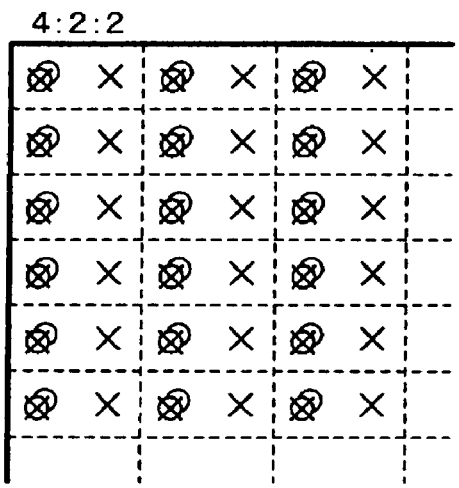
FIG. 18 is a schematic diagram for explaining a chroma format.

Next, the chroma format will be described in brief. FIGS. 17, 18, and 19 are schematic diagrams for explaining the chroma formats 4:4:4, 4:2:2, and 4:2:0. FIGS. 17A, 18A, and 19A show the sizes of matrixes and sampling phases of a luminance signal Y and color difference signals Cb and Cr. In those drawings, "X" represents the phase of the luminance signal Y, whereas two overlapped "Os" represent the phases of the color difference signals Cb and Cr.

As shown in FIG. 17A, in the chroma format 4:4:4, the matrix size and sampling phase of each of the color difference signals Cb and Cr and the luminance signal Y is the same. Thus, in the case of a macro block composed of four DCT blocks each of which is composed of eight pixels×eight pixels, as shown in FIG. 17B, the horizontal and vertical sizes of the matrix of each of the color difference signals Cb and Cr are the same as those of the matrix of the luminance signal Y. In other words, the size of matrix of each of the color difference signals Cb and Cr and the luminance signal is the same and each matrix is composed of four blocks.

On the other hand, in the chroma format 4:2:2, as shown in FIG. 18A, the horizontal size of the matrix of each of the color difference signals Cb and Cr is ½ of the horizontal size of the matrix of the luminance signal Y. Thus, in a macro block, the horizontal size of the matrix of each of the color difference signals Cb and Cr is ½ of the horizontal size of the matrix of the luminance signal Y.

In the chroma format 4:2:0, as shown in FIG. 19A, each of the horizontal size and the vertical size of the matrix of each of the color difference signals Cb and Cr is ½ of each of the horizontal size and the vertical size of the matrix of the luminance signal Y. Thus, in a macro block, each of the horizontal size and the vertical size of the matrix of each of the color difference signals Cb and Cr is ½ of each of the horizontal size and the vertical size of the matrix of the luminance signal Y.

Figure 18B:
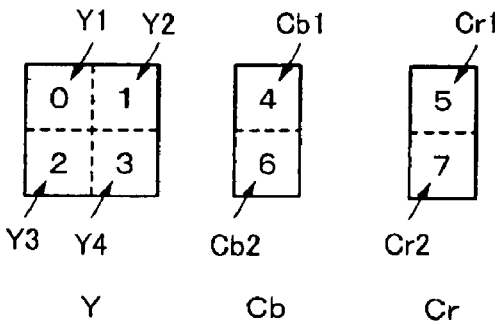
Figures 19A, 19B:
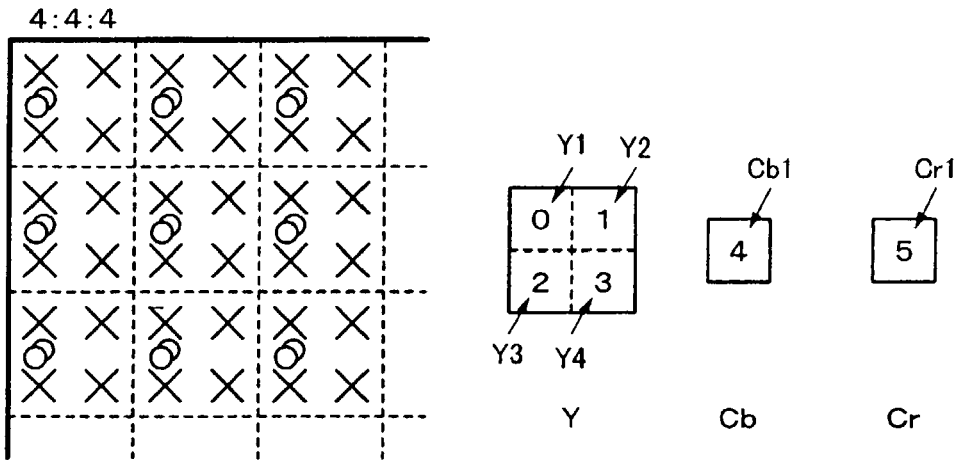
FIG. 19 is a schematic diagram for explaining a chroma format.

As shown in FIGS. 17B, 18B, and 19B, in each macro block, DCT blocks that composes the macro block are assigned numbers 1, 2, 3, and 4 from the upper left position. In the case of the chroma format 4:4:4, as shown in FIG. 17B, blocks of the macro block are encoded in the order of $Y_1$, $Y_2$, $Y_3$, $Y_4$, $Cb_1$, $Cr_1$, $Cb_2$, $Cr_2$, $Cb_3$, $Cr_3$, $Cb_4$, and $Cr_4$. Likewise, in the case of the chroma format 4:2:2, as shown in FIG. 18B, blocks of the macro block are encoded in the order of $Y_1$, $Y_2$, $Y_3$, $Y_4$, $Cb_1$, $Cr_1$, $Cb_2$, and $Cr_2$. In the case of the chroma format 4:2:0, as shown in FIG. 19B, blocks of the macro block are encoded in the order of $Y_1$, $Y_2$, $Y_3$, $Y_4$, $Cb_1$, and $Cr_1$.

Figure 20A:
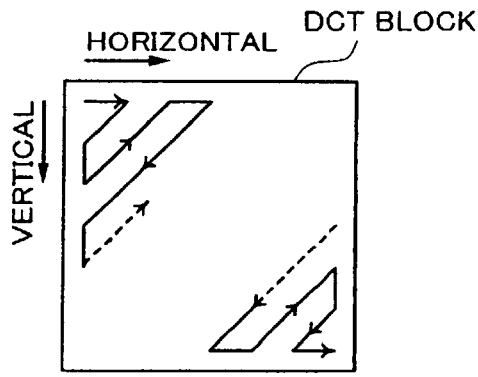
FIG. 20 is a schematic diagram for explaining an output method and a variable length encoding of a video encoder.
Figure 20B:
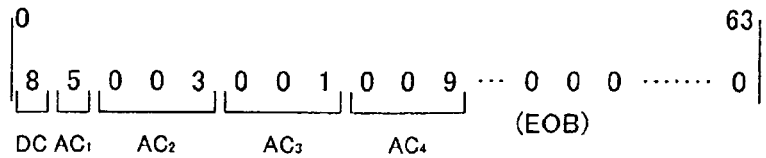

FIG. 20A shows the order of DCT coefficients of video data that is output from the DCT circuit of the MPEG encoder 102. This order applies to an MPEG ES that is output from the SDTI receiving portion 108. In the following description, an output of the MPEG encoder 102 will be described as an example. DCT coefficients are zigzag-scanned and output starting from the upper left DC component of the DCT block in the directions of which horizontal and vertical spatial frequencies become high. Thus, as shown in FIG. 20B, a total of 64 (8 pixels×8 lines) DCT coefficients are arranged in the order of frequency components.

The DCT coefficients are variable-length encoded by the VLC portion of the MPEG encoder. In other words, the first coefficient is fixed as a DC component. The next components (AC components) are assigned code corresponding to sets of runs of zeros and levels. Thus, the variable length code encoded output of coefficient data of AC components is a sequence of $AC_1, AC_2, AC_3, \ldots$ and so forth in the order from lower frequency (low order) components to higher frequency (high order) components. The elementary stream contains variable length code encoded DCT coefficients.

The record side stream converter that is built in the record side MFC 106 rearranges DCT coefficients of the supplied signal. In other words, the DCT coefficients arranged in the order of frequency components in each DCT block by the zigzag scanning are rearranged in the order of frequency components over all DCT blocks that composes the macro block.

FIG. 21 shows an outline of the rearrangement of DCT coefficients performed by the record side stream converter. In the case of a (4:2:2) component signal, one macro block is composed of four DCT blocks ($Y_1, Y_2, Y_3$, and $Y_4$) of the luminance signal Y, two DCT blocks ($Cb_1$ and $Cb_2$) of the color difference signal Cb, and two DCT blocks ($Cr_1$ and $Cr_2$) of the color difference signal Cr.

Figure 21A:
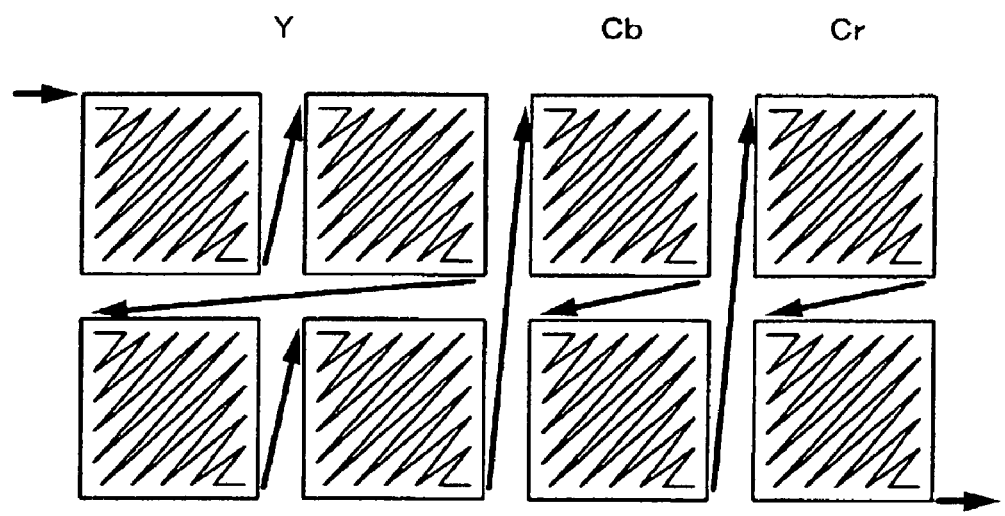
FIG. 21 is a schematic diagram for explaining the rearrangement of an output sequence of the video encoder.

As was described above, the MPEG encoder 102 zigzag-scans DCT coefficients corresponding to the MPEG2 standard. As shown in FIG. 21A, DCT coefficients are arranged in the order of a DC component and AC components from the lowest frequency component to the highest frequency component for each DCT block. After one DCT block has been zigzag-scanned, the next DCT block is zigzag-scanned. Likewise, DCT coefficients are arranged.

In other words, in a macro block, in each of the DCT blocks $Y_1, Y_2, Y_3$, and $Y_4$ and the DCT blocks $Cb_1, Cb_2, Cr_1$, and $Cr_2$, DCT coefficients are arranged in the order of a DC component and AC components from the lowest frequency component to the highest frequency component. Variable length code encoding is performed in such a manner that sets of runs and levels are assigned code such as [DC, $AC_1, AC_2, AC_3, \ldots$].

Figure 21B:
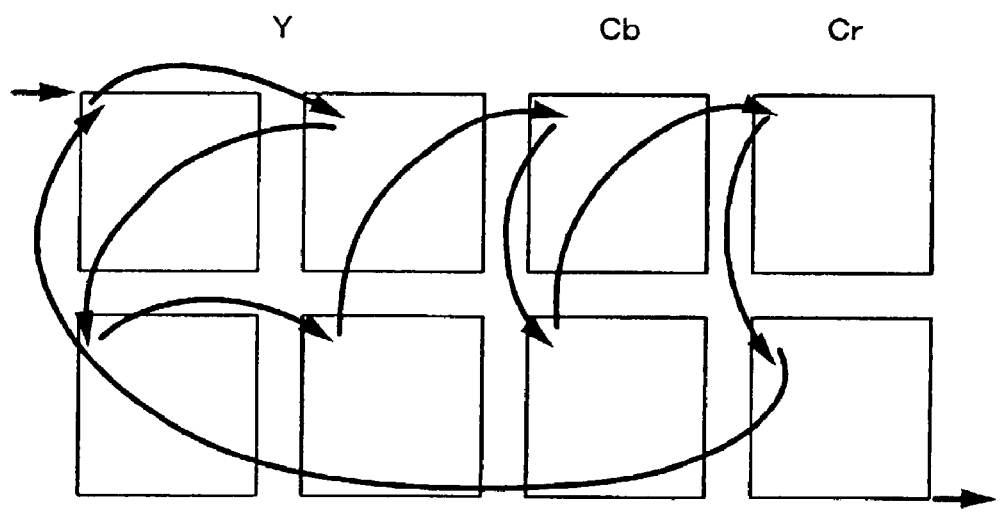

The record side stream converter interprets the DCT coefficients encoded with variable length code, detects the delimitation of each coefficient, and arranges DCT coefficients over all DCT blocks of the macro block corresponding to frequency components. FIG. 21B shows such a process. Firstly, the stream converter arranges DC components over eight DCT blocks of the macro blocks. Thereafter, the stream converter arranges the lowest frequency AC components over the eight DCT blocks. Likewise, the stream converter arranges AC coefficient data over the eight DCT blocks corresponding to each order component.

The coefficient data is rearranged in the order of DC ($Y_1$), DC ($Y_2$), DC ($Y_3$), DC ($Y_4$), DC ($Cb_1$), DC ($Cr_1$), DC ($Cb_2$), DC ($Cr_2$), $AC_1$ ($Y_1$), $AC_1$ ($Y_2$), $AC_1$, ($Y_3$), $AC_1$ ($Y_4$), $AC_1$ ($Cb_1$), $AC_1$ ($Cr_1$), $AC_1$ ($Cb_2$), $AC_1$, ($Cr_2$), ... and so forth. As was described with reference to FIG. 20, DC, AC1, AC2, ... and so forth are variable length code assigned to sets of runs and levels.

The converted elementary stream of which the order of coefficient data has been changed by the record side stream converter is supplied to the packing and shuffling portion of the ECC encoder 109. The data length of each macro block of the converted elementary stream is the same as the data length of each macro block of non-converted elementary stream. In addition, although the MPEG encoder 102 fixes the length of each GOP (one frame) by the bit rate control, the length of each macro block varies. The packing and deshuffling portion packs data of the macro block to a fixed length.

FIG. 22 shows an outlines of a packing process for macro blocks performed by the packing and shuffling portion. Macro blocks are packed to a predetermined fixed length. The fixed length corresponds to the data length of the payload that is the data storage area of a sync block that is the minimum unit of data that is recorded and reproduced. Thus, the shuffling and error correction code encoding process can be easily performed. For simplicity, in FIG. 22. it is assumed that one frame contains eight macro blocks.

Figure 22A:
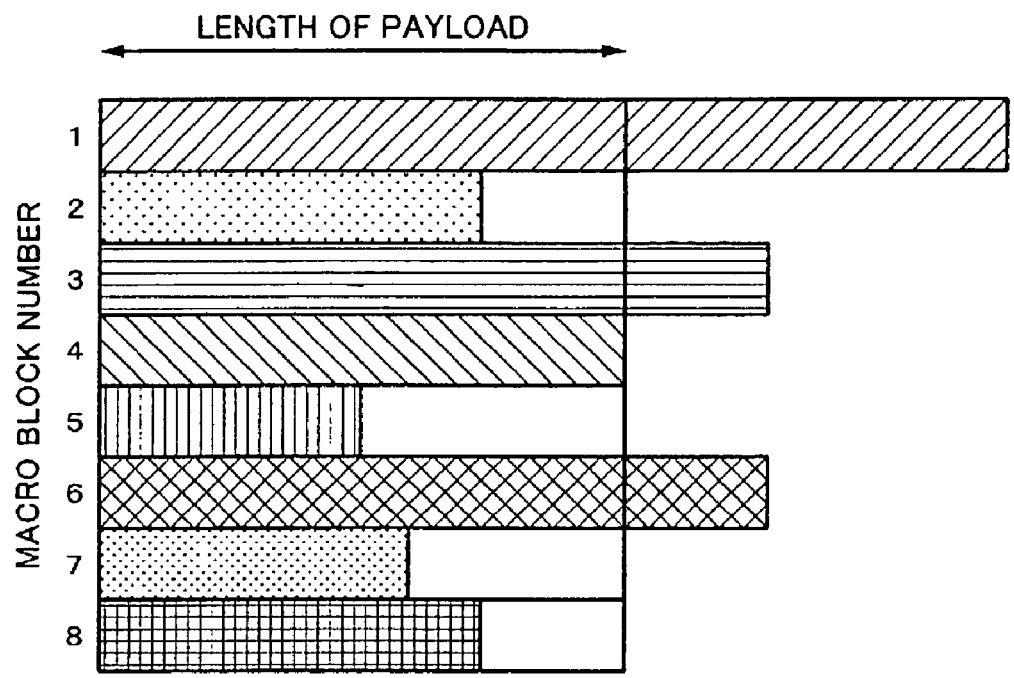
FIG. 22 is a schematic diagram for explaining a process for packing the sequence rearranged data to sync blocks.

As shown in FIG. 22A, since the variable length encoding process is performed for eight macro blocks, their lengths are different each other. In this example, the length of each of macro blocks #1, #3, and #6 is larger than the fixed length as the length of the data area (payload) of one sync block. The length of each of macro blocks #2, #5, #7, and #8 is smaller than the fixed length. The length of macro block #4 is almost equal to the fixed length.

Figure 22B:
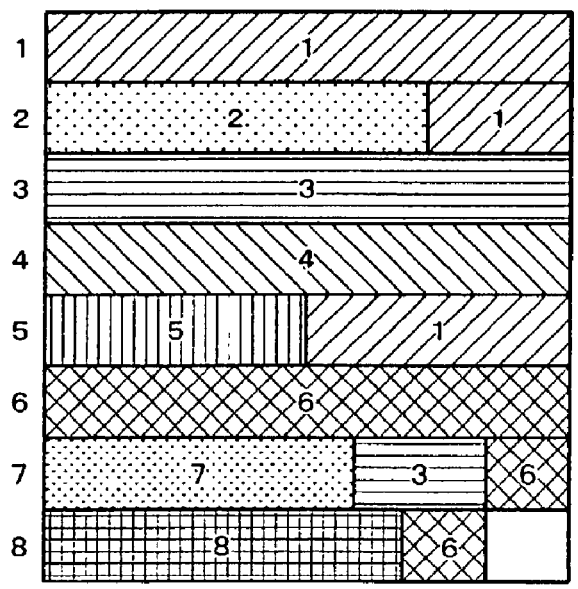

The packing process packs a macro block to the fixed length as the payload length. This is because the amount of data generated in one frame period is fixed. As shown in FIG. 22B, when the length of a macro block is longer than the length of the payload, the macro block is divided at the position of the length of the payload. The portion that exceeds the length of the payload (namely, overflow portion) is successively packed to macro blocks each of which does not exceed the length of the payload in such a manner that the overflow portion is preceded by those macro blocks.

In the example shown in FIG. 22B, in the macro block #1, the portion that exceeds the length of the payload is packed after the macro block #2. When the length of the resultant macro block #2 becomes the same as the length of the payload, the remaining portion is packed after the macro block #5. Next, in the macro block #3, the portion that exceeds the length of the payload is packed after the macro block #7. Thereafter, in the macro block #6, the portion that exceeds the length of the payload is packed after the macro block #7. The remaining portion is packed after the macro block #8. In such a manner, each macro block is packed to the fixed length as the length of the payload.

The record side stream converter can predetermine the length of variable length data of each macro block in advance. Thus, the packing portion can know the end of data of each macro block without need to decode VLC data and check the content.

As was described above, according to the embodiment, DCT coefficients are rearranged in each macro block. In addition, each macro block data as one picture is packed to the payload. Thus, even if an error that exceeds the error correction capacity of the error correction code due to a dropout of a tape, the picture quality can be suppressed from being deteriorated.

Next, with reference to FIGS. 23 and 24, the effect of the rearrangement of coefficients and the effect of packing will be described. In this example, the case of the chroma format 4:2:2 will be described. FIG. 23 shows the case that DCT blocks and DCT coefficients are supplied corresponding to an MPEG ES. In this case, as shown in FIG. 23A, slice header and macro block (MB) header are followed by DCT blocks in the order of luminance signals $Y_1$ to $Y_4$ and color difference signals $Cb_1, Cr_1, Cb_2$, and $Cr_2$. In each block, DCT coefficients are arranged in the order of a DC component and AC components from the lowest order component to the highest order component.

Now, it is assumed that for example an ECC decoder, an error takes place at the timing of the position A of FIG. 23A (namely, in a high order coefficient of the block Cb1). As was described above, in the MPEG, one slice composes one variable length code sequence. Thus, once an error takes place, data preceded by the error position is unreliable until the next slice header is detected. Thus, in a stream of which one slice is composed of one macro block, data preceded by the position A of the macro block cannot be decoded.

As a result, as shown in FIG. 23B, in the blocks $Cr_1$, $Cb_2$, and $Cr_2$ of the color difference signals, even DC components cannot be decoded. Thus, for portion B corresponding to the blocks $Y_1$ and $Y_2$, since high order coefficients of the block $Cb_1$ and other blocks of the color difference signals cannot be decoded, a picture in an abnormal color corresponding to low order coefficients of the block $Y_3$ is generated. For portion C corresponding to the blocks Y3 and Y4, since only the luminance signal is decoded, a picture in monochrome is generated.

Figure 24A:
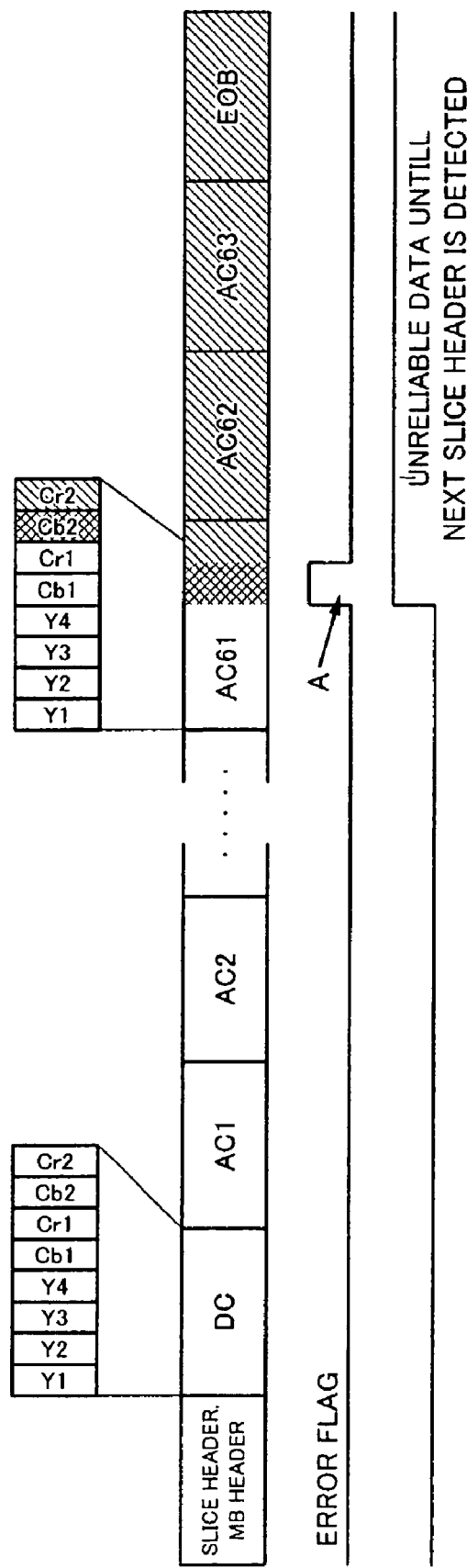
FIG. 24 is a schematic diagram for explaining the effects of the rearrangement of coefficients and packing thereof.

FIG. 24 shows a converted stream of which DCT coefficients have been rearranged according to the embodiment. In the example, as with the case shown in FIG. 23, it is assumed that an error takes place at position A. As shown in FIG. 24A, slice header and macro block header are followed by blocks of which DCT coefficients are arranged over all DCT blocks corresponding to components in the order of DC components to AC components from the lowest order component to the highest order component.

Figure 24B:
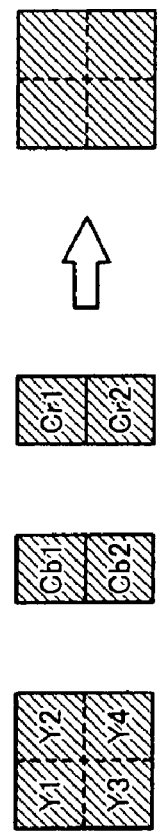

In this case, data preceded by the error position is unreliable until the next slice header is detected. Data preceded by the error position A of the macro block is not decoded. However, in the converted stream, only higher order AC components of each DCT block cannot be decoded due to an error. In other words, DC components and lower order AC coefficients of DCT coefficients of individual DCT blocks can be equally obtained. Thus, as shown in FIG. 24B, since higher order AC components are not decoded, although the picture cannot be finely generated, unlike with the above-described MPEG ES, the picture can be almost prevented from being abnormally generated such as monochrome picture or abnormal color due to absence of one of two color difference components.

Thus, even if data packed in the fixed length cannot be decoded, a proper picture quality can be secured. Thus, when a picture is reproduced at high speed, the picture quality can be suppressed from being deteriorated.

FIG. 25 shows a more practical structure of the above-described ECC encoder 109. In FIG. 25, reference numeral 164 is an interface for an external main memory 160 connected to the IC. The main memory 160 is composed of an SDRAM. The interface 164 arbitrates a request from the ECC encoder 109 to the main memory 160 and performs a read/write process from and to the main memory 160. In addition, a packing portion 137a, a video shuffling portion 137b, and a packing portion 137c compose a packing and shuffling portion 137.

Figure 26:
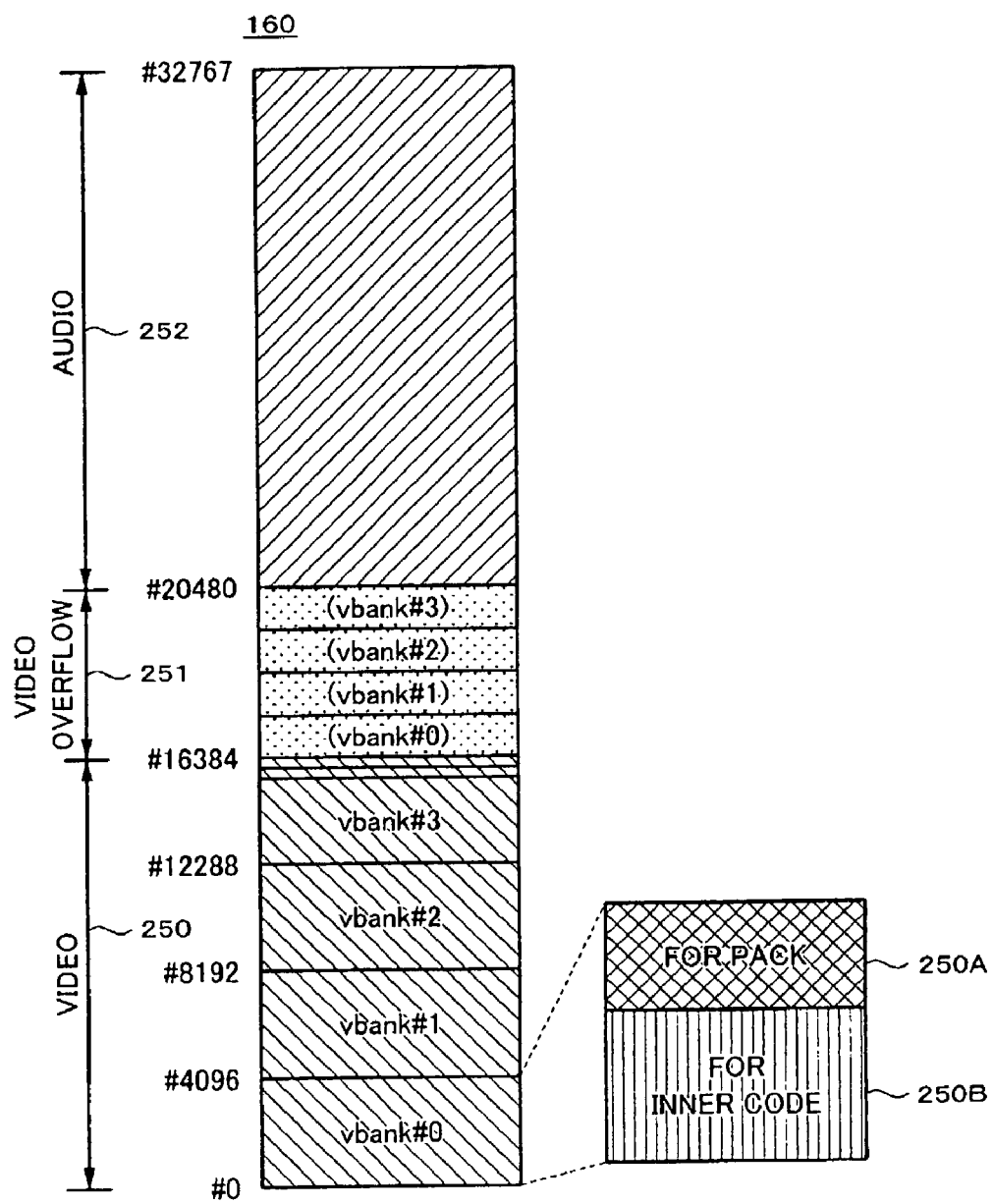
FIG. 26 is a schematic diagram showing an example of an address structure of a main memory.

FIG. 26 shows an example of the address structure of the main memory 160. The main memory 160 is composed of for example a 64-Mbit SDRAM. The main memory 160 comprises a video area 250, an overflow area 251, and an audio area 252. The video area 250 is composed of four banks (vbank #0, vbank #1, vbank #2, and vbank #3). Each of the four banks can store a digital video signal for one fixed length unit. One fixed length unit is a unit of which the amount of generated data is controlled to an almost target value. One equal length unit is for example one picture (I picture) of a video signal. In FIG. 26, portion A represents a data portion of one sync block of a video signal. One sync block contains data of bytes that depend on the format that is used. To deal with a plurality of formats, the data size of one sync block is larger than the maximum number of bytes of sync blocks of individual formats. For example, the number of bytes of one sync block is 256 bytes.

Each bank of the video area is divided into a packing area 250A and an inner code encoder output area 250B. The overflow area 251 is composed of four banks corresponding to the above-described video area. The main memory 160 has an audio data processing area 252.

According to the embodiment, with reference to a data length sign of each macro block, the packing portion 137a stores the fixed length data and overflow data that exceeds the fixed length to different areas of the main memory 160. The fixed length data is data that does not exceed the length of the data area (payload) of a sync block. Hereinafter, the fixed length data is referred to as block length data. The block length data is stored in the packing area 250A of each bank. When the length of a macro block is smaller than the block length, the corresponding area of the main memory 160 has a blank region. The video shuffling portion 137b controls the write addresses so as to shuffle macro blocks. The video shuffling portion 137b shuffles only block length data rather than overflow portions. The overflow portions are written to an area assigned to the overflow data.

Next, the packing portion 137c packs overflow portions to a memory of an outer code encoder 139. In other words, the packing portion 137c reads data having the block length from the main memory 160 to a memory for one ECC block of the outer code encoder 139. When the block length data has a blank region, the packing portion 137c packs the overflow portion to the block length data having the blank region. After the packing portion 137c has read data for one ECC block, it temporarily stops reading data. The outer code encoder 139 generates an outer code parity. The outer code parity is stored to the memory of the outer code encoder 139. After the outer code encoder 139 has completed the process for one ECC block, data and outer code parities that are output from the outer code encoder 139 are rearranged in the order of the inner code encoding. The resultant data is written again to an output area 250B that is different from the packing process area 250A of the main memory 160. A video shuffling portion 140 controls the addresses of the main memory 160 at which data that has been encoded with outer code is written so as to shuffle sync blocks.

In such a manner, block length data and overflow data are separated. The block length data is written to the first area 250A (as first packing process). The overflow data is packed to the memory of the outer code encoder 139 (as second packing process). The outer code parity is generated. The data and outer code parity are written to the second area 250B of the main memory 160. Those processes are performed for each ECC block. Since the outer code encoder 139 has a memory having the size of one ECC block, the access frequency against the main memory 160 can be decreased.

After a predetermined number of ECC blocks contained in one picture (for example, 32 ECC blocks) have been processed, the packing process and the outer code encoding process for one picture are completed. Data that is read from the area 250B of the main memory 160 is processed by an ID adding portion 148, an inner code encoder 149, and a synchronization adding portion 150. A parallel-serial converting portion 124 converts output data of the synchronization adding portion 150 into bit serial data. The output serial data is processed by a partial response class 4 precoder 125. When necessary, the output is digitally modulated. The resultant data is supplied to a rotating head disposed on the rotating drum 111.

A sync block that does not have valid data (this sync block is referred to as null sync) is placed in an ECC block so that ECC blocks can become flexible against the difference of formats of record video signals. A null sync is generated by the packing portion 137*a* of the packing and shuffling portion 137. The generated null sync is written to the main memory 160. Thus, since the null sync has a data record area, it can be used as a record sync for an overflow portion.

In the case of audio data, even number samples and odd number samples of audio data of one field form different ECC blocks. Since an ECC outer code sequence is composed of audio samples in the input order, whenever an audio sample of an outer code sequence is input, an outer code encoder 136 generates an outer code parity. A shuffling portion 137 controls the addresses of the audio data processing area 252 of the main memory 160 against an output of the outer code encoder 136 so as to shuffle it (in each channel and in each sync block).

In addition, a CPU interface 126 is disposed. The CPU interface 126 receives data from an external CPU 127 that functions as a system controller and designates parameters for the internal blocks. To handle a plurality of formats, the CPU interface 126 can designate many parameters such as sync block length, parity length.

"Packing length data" as a parameter is sent to the packing portions 137*a* and 137*b*. The packing portion 137*a* and 137*b* each pack VLC data in the fixed length (that is a length represented as "payload length" shown in FIG. 22A) designated corresponding to the parameter "packing length data".

"Number of packs data" as a parameter is sent to the packing portion 137*b*. The packing portion 137*b* designates the number of packs per sync block corresponding to the parameter "number of packs data". Data for the designated number of packs is supplied to the outer code encoder 139.

"Number of video outer code parities data" as a parameter is sent to the outer code encoder 139. The outer code encoder 139 encodes video data having parities corresponding to the parameter "number of video outer code parities data" with outer code.

"ID information" and "DID information" as parameters are sent to an ID adding portion 148. The ID adding portion 148 adds the ID information and the DID information to a data sequence having a unit length that is read from the main memory 160.

"Number of video inner code parities data" and "number of audio inner code parities data" as parameters are sent to the inner code encoder 149. The inner code encoder 149 encodes video data and audio data having parities corresponding to the parameters "number of video inner code parities data" and "number of audio inner code parities data" with inner code. In addition, "sync length data" as a parameter is sent to the inner code encoder 149. Thus, the unit length (sync length) of data that has been encoded with inner code is limited.

In addition, shuffling table data as a parameter is stored to a video shuffling table (RAM) 128*v* and an audio shuffling table (RAM) 128*a*. The shuffling table 128*v* performs an address conversion for the video shuffling portions 137*b* and 140. The shuffling table 128*a* performs an address conversion for the audio shuffling 137.

Next, the embodiment of the present invention will be described further in detail. According to the embodiment, field chroma_format is detected from a stream. Corresponding to the value of the field chroma_format, time slots for defining the periods for processes are selected. For example, the time slots are defined corresponding to the chroma format 4:2:2. In the chroma format 4:2:0, processes are not performed for portions corresponding to DCT blocks $Cb_2$ and $Cr_2$ that are present in the chroma format 4:2:2.

In other words, in an MPEG ES, the time slots of the chroma format 4:2:0 are designed so that processes are not performed in the periods corresponding to the DCT blocks $Cb_2$ and $Cr_2$ of the chroma format 4:2:2. In a converted stream of which coefficients of an MPEG ES are rearranged over all DCT blocks, time slots are designed so that processes are not performed in the periods corresponding to the chroma data $Cb_2$ and $Cr_2$ for each order of DCT coefficients.

In the following description, time slots in the periods corresponding to the chroma data $Cb_2$ and $Cr_2$ and time slots in the periods corresponding to the above-described DCT blocks $Cb_2$ and $Cr_2$ are referred to as time slots $Cb_2$ and $Cr_2$. In addition, the field that represents the chroma format in a stream and the value represented in the field are denoted by chroma_format so as to distinguish it from the chroma formats 4:2:2, 4:2:0, and 4:4:4 of video signals.

Figure 27:
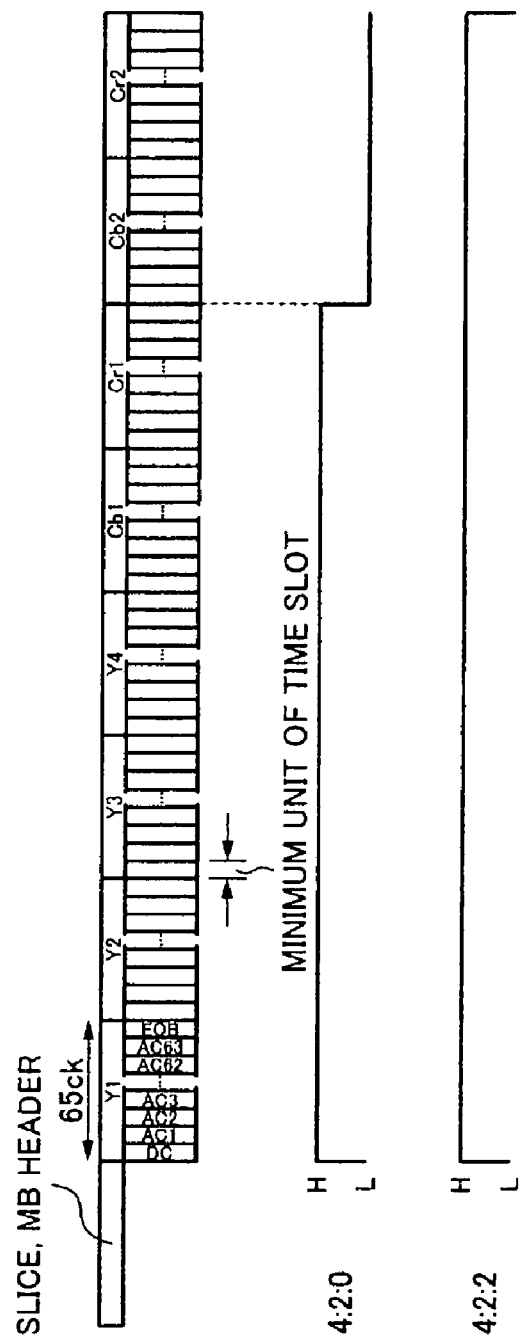
FIG. 27 is a time chart showing an example of time slots that allow a signal in the chroma format 4:2:2 and a signal in the chroma format 4:2:0 to be in common.

Next, with reference to timing charts shown in FIGS. 27 and 28, the above-described time slots will be described. FIG. 27 is a timing chart showing an example of time slots in the case that an input stream is an MPEG ES. FIG. 27 shows a stream for one macro block (=one slice).

As shown in FIG. 27A, in the input MPEG ES, slice header and macro block header are followed by DCT blocks in the order of the luminance signal and the color difference signals. In each DCT block, DCT coefficients are arranged in the order of a DC component and AC components from the lowest order component to the highest order component. The length of each block is fixed to for example 65 clocks corresponding to the number of DCT coefficients and the number of EOBs.

As was described in FIGS. 17 to 19, the number of DCT blocks in one macro block depends on the chroma format for use. When the chroma format is 4:2:2, one macro block is composed of eight DCT blocks $Y_1$, $Y_2$, $Y_3$, $Y_4$, $Cb_1$, $Cr_1$, $Cb_2$, and $Cr_2$. When the chroma format is 4:2:0, one macro block is composed of six DCT blocks $Y_1$, $Y_2$, $Y_3$, $Y_4$, $Cb_1$, and $Cr_1$. In other words, in the chroma format 4:2:0, unlike with the chroma format 4:2:2, the blocks $Cb_2$ and $Cr_2$ are not present.

Thus, according to the embodiment, time slots are generated corresponding to the chroma format 4:2;2. The unit of the time slots is one clock. In the case of the chroma format 4:2:2, as shown in FIG. 27C, the time slots are generated so that the level is "H" in the periods of the blocks $Y_1$ to $Cr_2$. In the case of the chroma format 4:2:0, as shown in FIG. 27B, time slots are generated so that in the periods corresponding to the blocks $Cb_2$ and $Cr_2$ of the chroma format 4:2:2, the level is "L" and in the periods of the blocks $Y_1$, and $Cr_1$ is "H".

Next, the case of an input stream is a converted stream of which DCT coefficients of an MPEG ES are rearranged over all DCT blocks will be described. FIG. 28 is a timing chart showing an example of time slots in the case that an input stream is a converted stream. In FIG. 28, as with the case shown in FIG. 27, a stream of one macro block (=one slice) is shown.

In the case of a converted stream, slice header and macro block header are followed by coefficients over all DCT blocks of one macro block in the order of DC components and AC components from the lowest order component to the highest order component. In other words, each of a DC component and AC components is assigned eight clocks. The eight clocks are assigned the coefficients $Y_1, Y_2, Y_3, Y_4$, $Cb_1, Cr_1, Cb_2$, and $Cr_2$ for each order component.

Thus, in this case, when the chroma format is 4:2:0, as shown in FIG. 28B, time slots are generated so that the level of the slots of the coefficients $Cb_2$ and $Cr_2$ that are not present in the chroma format 4:2:0 is "L" and the level of the other slots is "H". In the case of the chroma format 4:2:2, as shown in FIG. 28C, time slots are generated so that the level of all slots is "H".

Signals that represent such time slots are generated. With the signals, the processes of the record side MFC 106 and the reception side MFC 114 are controlled. While the level of the time slots is "L", the processes are not performed. The record side MFC 106 and the reception side MFC 114 wait until the level of the time slots becomes "H". Thus, in the timing for processing a stream of the chroma format 4:2:2, a stream of the chroma format 4:2:0 can be processed.

Figure 29:
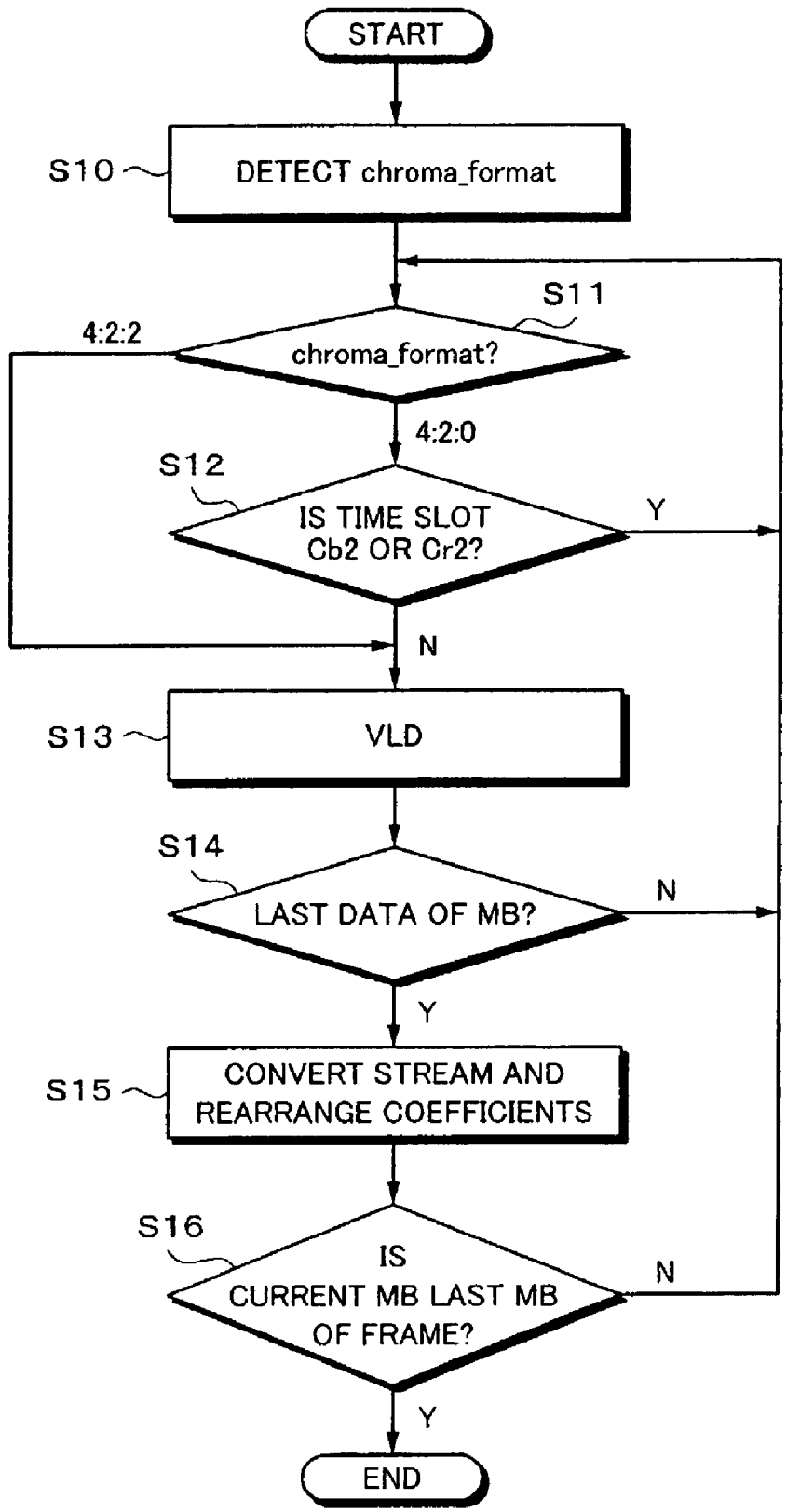
FIG. 29 is a flow chart showing an example of a process of a stream converter corresponding to the time slots according to the embodiment

FIG. 29 is a flow chart showing an example of the process of the stream converter according to the embodiment. This flow chart can be applied to both the record side MFC 106 and the reception side MFC 114. The process of the flow chart is repeated for each frame.

At the first step S10, chroma_format that is a field representing the chroma format is detected from the input stream. At the next step S11, a determination corresponding to the value of chroma_format is performed. When chroma_format represents that the input stream is a stream corresponding to the chroma format 4:2:2, the flow advances to step S13.

In contrast, when chroma_format represents that the input stream is a stream corresponding to the chroma format 4:2:0, the flow advances to step S12. At step S12, it is determined whether or not the current time slot is the time slot $Cb_2$ or $Cr_2$. When the current time slot is the time slot Cb2 or Cr2, the flow returns to step S11. At step S11, the process of step S12 is performed corresponding to chroma_format.

Thus, for a digital video signal corresponding to the chroma format 4:2:0, the processes for $Cb_2$ and $Cr_2$ that are present in the chroma format 4:2:2, not in the chroma format 4:2:0, are skipped.

When the determined result at step S12 represents that the current time slot is neither for $Cb_2$, nor for $Cr_2$, the flow advances to step S13. At step S13, variable length code is decoded. At the next step S14, it is determined whether or not the processed data is the last data of the current macro block. This process can be performed by counting the number of EOBs each of which is added at the end of each DCT block. When the chroma format is 4:2:2, one macro block is composed of eight DCT blocks. Thus, one macro block contains eight EOBs. When the chroma format is 4:2:0, one macro block is composed of six DCT blocks. Thus, one macro block contains six EOBs. Corresponding to chroma_format, the number of EOBs is counted. Thus, the end of a macro block can be detected.

When the determined result represents that the current DCT block is not the end of the current macro block, the flow returns to step S11. At step S11, the process corresponding to chroma_format is performed. In contrast, when the determined result at step S14 represents that the current DCT block is the end of the current macro block, the flow advances to step S15.

At step S15, a process for rearranging the input stream is performed. For example, the input stream of which DCT coefficients have been arranged in each DCT block of one macro block is converted into a stream of which DC components and AC components are arranged over all DCT blocks of one macro block in the order of DC components and AC components from the lowest order components to the highest order components (namely, a converted stream is generated). Likewise, when a converted stream is input, it is rearranged to an MPEG ES.

After the stream has been rearranged, at step S16, it is determined whether or not the current macro block is the end macro block of one frame (one picture). When the determined result represents that the current macro block is the end macro block of one frame, the sequence of processes for one frame is completed. In contrast, when the determined result represents that the current macro block is not the end macro block of one frame, the flow returns to step S11. At step S11, the process corresponding to chroma_format is performed.

Figure 30:
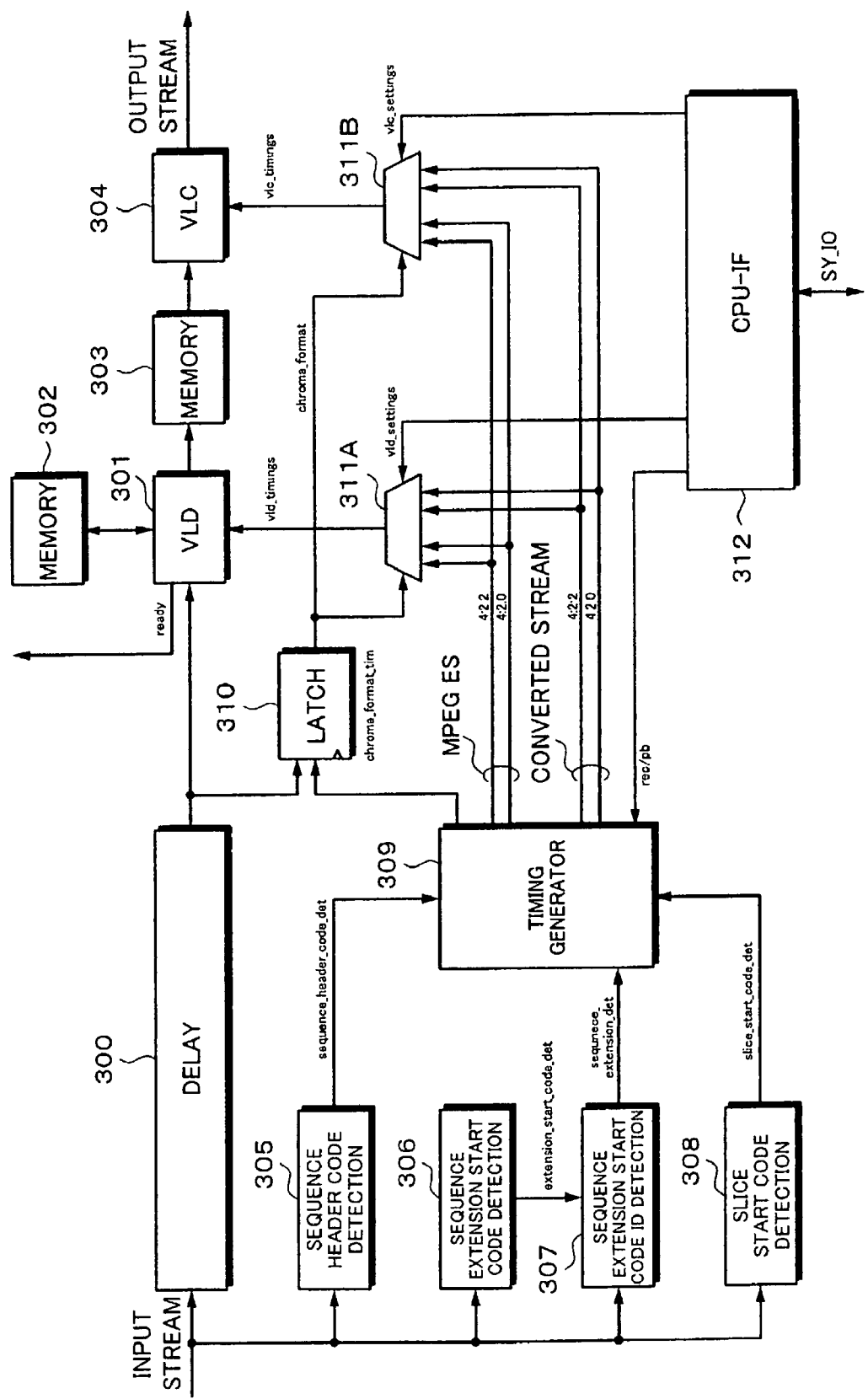
FIG. 30 is a block diagram showing an example of the structure of a record side MFC 106 and a reproduction side MFC 114.

FIG. 30 shows an example of the structure of the record side MFC 106 that performs the above-described processes. The structure shown in FIG. 30 is shared by the reception side MFC 114. Of course, the structure may be independently disposed for each of the record side MFC 106 and the reception side MFC 114. First of all, the recording operation of the record side MFC 106 will be described. An MPEG ES is supplied to a delay circuit 300. In addition, the MPEG ES is supplied to a sequence header code detecting circuit 305, a sequence extension start code detecting circuit 306, a sequence extension start code ID detecting circuit 307, and a slice start code detecting circuit 308.

These detecting circuits 305 to 308 perform for example a pattern matching for the input MPEG ES and detect header information of designated hierarchical levels. From the MPEG ES supplied from the detecting circuit 305 to 307, chroma_format that is a chroma format field contained in sequence extension 3 is detected.

Figures 31A, 31B:
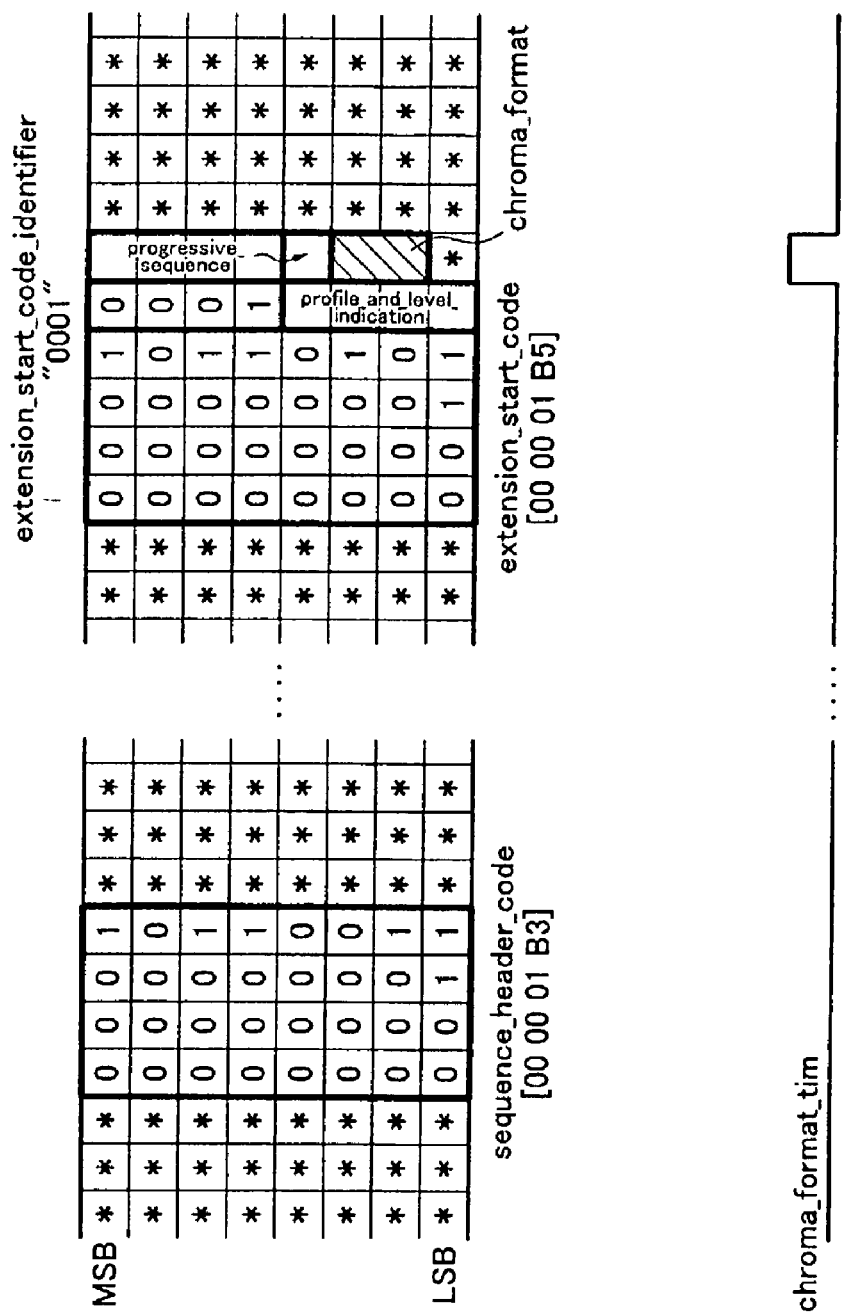
FIG. 31 is a schematic diagram showing a bit arrangement of an MPEG ES that is supplied with an eight-bit bus.

FIG. 31 shows an outline of the bit arrangement of the MPEG ES in the case that it is supplied using an eight-bit bus. At the beginning of the sequence layer, sequence header code 1 whose byte arrangement is [00 00 01 B3] is placed. The sequence header 2 starting with the sequence header code 1 is followed by sequence extension 3. At the beginning of the sequence extension 3, extension start code (extension_start_code) whose byte arrangement is [00 00 01 B5] is placed. The extension start code is immediately followed by extension start code ID (extension_start_code_identifier) composed of four bits. At the high order sixth bit of the next byte (namely, 10-th bit from the end of the extension start code ID), field chroma_format having two bits is placed.

FIG. 32 shows the relation between chroma_format and the chroma formats of video signals. Chroma_format having two bits represents three types of chroma formats. Chroma—format [01] represents the chroma format 4:2:0 of a video signal. Chroma_format [10] represents the chroma format 4:2:2 of a video signal. Chroma_format [11] represents chroma format 4:4:4 of a video signal. However, chroma_format [00] is system-reserved.

The sequence header detecting circuit 305 detects sequence header code 1 from the input stream. Since the byte arrangement of the sequence header code 1 is [00 00 01 B3], the sequence header detecting circuit 305 performs a pattern matching for each byte. By detecting the byte arrangement, the sequence header detecting circuit 305 detects the sequence header code 1. The detected result is output as signal sequence_header_code_det. The signal is supplied to a timing generator 309.

The extension start code detecting circuit 306 detects extension start code of the sequence extension 3. The byte arrangement of the extension start code is [00 00 01 B5]. By performing a pattern matching for each byte, the extension start code detecting circuit 306 detects the byte arrangement and thereby sequence extension start code. The detected result is output as signal extension_start_code_det. The signal extension_start_code_det is supplied to the sequence extension start code ID detecting circuit 307. In addition, the signal is also supplied to a timing generator 309 (not shown).

The sequence extension start code ID detecting circuit 307 detects extension start code ID from the supplied MPEG ES corresponding to the signal extension_start_code_det. The sequence extension start code ID is a field immediately preceded by the sequence extension start code. The sequence extension start code ID represents which extension data is received with the sequence extension 3. After the sequence extension start code detecting circuit 306 has detected the extension start code, the sequence extension start code ID detecting circuit 307 checks high order four bits of the next one byte. When the bit arrangement of the four bits is "0001", it is determined that the field chroma_format starts at the high order sixth of the next one byte (namely, 10-th bit from the end of the sequence extension start code ID). The detected result of the sequence extension start code ID detecting circuit 307 is output as signal sequence_extension_det. The signal sequence_extension_det is supplied to the timing generator 309.

On the other hand, the slice start code detecting circuit 308 detects slice start code 12 from the supplied MPEG ES. The byte arrangement of the slice start code 12 is [00 00 01 xx] (where [xx] is any value in the range from [01] to [AF]). By performing a pattern matching for each byte, the slice start code detecting circuit 308 detects the byte arrangement and thereby the slice start code. The detected result is output as signal slice_start_code_det. The signal slice_start_code_det is supplied to the timing generator 309.

The timing generator 309 generates various timing signals corresponding to the detected results of the above-described detecting circuits 305, 307, and 308. The timing generator 309 has a counter that operates with for example a clock. When the sequence extension start code detecting circuit 306 detects extension start code, the timing generator 309 causes the counter to start. When it is determined that desired extension data has been supplied corresponding to signal sequence_extention_det, as shown in FIG. 31, signal chroma_format_tim that becomes active at the second clock after the end of extension start code is output. The high order sixth and seventh bits of the byte of which signal chroma_format_time becomes active represents chroma_format. The signal chroma_format_time is supplied to a latch circuit 310.

The latch circuit 310 latches the MPEG ES that is output from the delay circuit 300 corresponding to the signal chroma_format_tim supplied from the timing generator 309. The latch circuit 310 extracts chroma_format from the latched data. As shown in FIG. 31, the latch circuit 310 latches the low order second byte of the extension start code corresponding to the signal chroma_format_tim. The latch circuit 310 extracts the field chroma_format from the high order six and seventh bits of the latched data.

Figure 28:
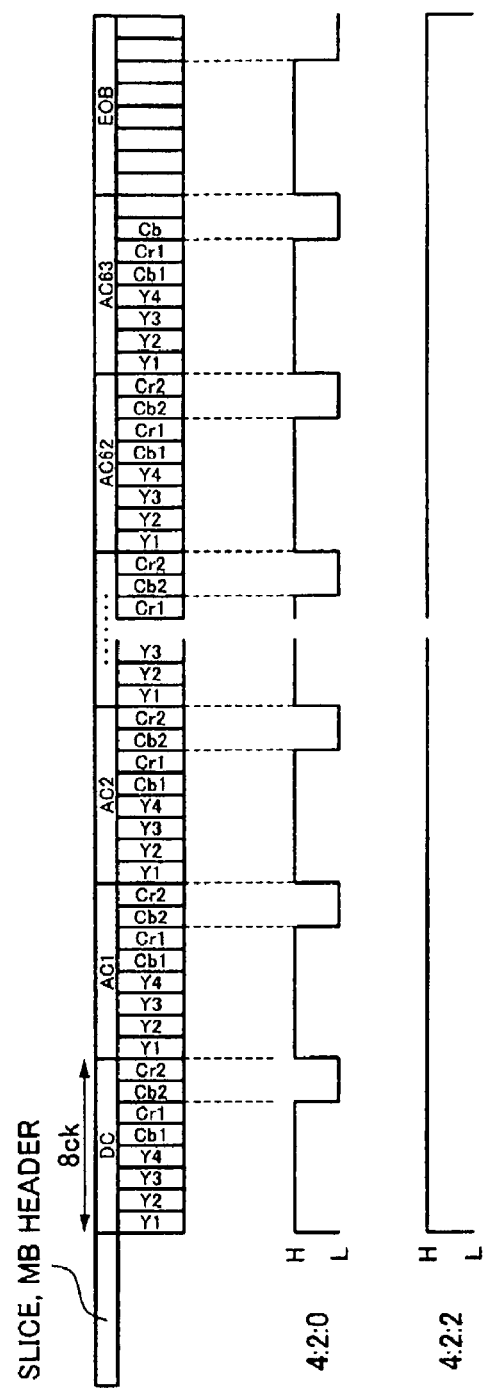
FIG. 28 is a time chart showing an example of time slots that allow a signal in the chroma format 4:2:2 and a signal in the chroma format 4:2:0 to be in common.

In addition, the timing generator 309 outputs signals that represent the time slots shown in FIGS. 27 and 28. In other words, the timing generator 309 outputs signals that represent the time slots corresponding to an MPEG ES for each of the chroma formats 4:2:2 and 4:2:0. In addition, the timing generator 309 outputs signals that represent the time slots corresponding to converted streams of which DCT coefficients of each MPEG ES have been rearranged corresponding to the chroma formats 4:2:2 and 4:2:0. The four signals that represent the time slots are signals that are reset corresponding to signal slice_start_code_det that is output from the slice start code detecting circuit 308. The four signal that represent the time slots are supplied to selectors 311A and 311B.

A CPU I/F 312 interfaces between the system controller 121 that controls all the portion of the recording and reproducing apparatus and the structure shown in FIG. 30. The system controller 121 outputs signal vld_settings and signal vlc_settings to the selectors 311A and 311B corresponding to the record/reproduction mode of the apparatus. The signal vld_settings and the signal vlc_settings are supplied to the selectors 311A and 311B through the CPU I/F 312.

The selectors 311A and 311B each select one of the input signals and output the selected signal corresponding to chroma_format that is output from the latch circuit 310 and the signal vld_settings and the signal vlc_settings that are output from the latch circuit 310. An output of the selector 311A is supplied as signal vld_timings to a VLD 301 (that will be described later). The VLD 301 is controlled corresponding to the signal vld_timings. Likewise, an output of the selector 311B is supplied as signal vlc_timings to a VLC 304 (that will be described later). The VLC 304 is controlled corresponding to the signal vlc_timings.

On the other hand, the MPEG ES that is input from the SDTI receiving portion 108 is phase-adjusted through the delay circuit 300 so as to absorb the delay due to the detecting process. The delay-adjusted MPEG ES is supplied to the variable length code decoding circuit (VLD) 301. The MPEG ES supplied to the VLD 301 is temporarily stored to a memory 302 connected to the VLD 301.

The VLD 301 performs a read control for the memory 302 and reads the MPEG ES stored in the memory 302. With reference to variable length code pre-stored in a code table (not shown), the VLD 301 interprets variable length code of the read MPEG ES and converts it into data having an effective length for each DCT block or each DCT coefficient. The VLD 301 controls the addresses of the converted data corresponding to the signal vld_settings and stores the converted data to a memory 303 in the predetermined order. The timing of the process performed by the VLD 301 is controlled corresponding to the signal vld_timing that has been selected and supplied by the selector 311A corresponding to chroma_format and the signal vld_settings.

The VLD 301 is controlled so that when the level of the signal vld_timings is "H", the VLD 301 performs the process and when the level of the signal vld_timings is "L", the VLD 301 does not perform the process. When chroma_format represents the chroma format 4:2:2, the selector 311A selects the signal vld_timings shown in FIG. 27C. In this case, the VLD 301 performs the process in all the slots. In contrast, when chroma_format represents the chroma format 4:2:0, the selector 311A selects the signal vld_timings shown in FIG. 27B. In the periods of the blocks $Cb_2$ and $Cr_2$ that are not present in the chroma format 4:2:0, the VLD 301 performs the process for the blocks $Cb_2$ and $Cr_2$ as null slots (in other words, the VLD 301 does not process for them). In such a manner, for an MPEG ES, both the chroma formats 4:2:2 and 4:2:0 can be handled.

In addition, the VLD 301 outputs signal ready that requests the frame memory 170 connected to the SDTI receiving portion 108 to read data when the amount of data stored in the memory 302 becomes a predetermined value or smaller.

The addresses of data stored in the memory 303 are controlled by the variable length code encoding circuit (VLC) 304 corresponding to the signal vlc_settings in such a manner that data is read in the row direction and the resultant data is written in the column direction. Thus, as shown in FIG. 21, DCT coefficients are rearranged.

Figure 33:
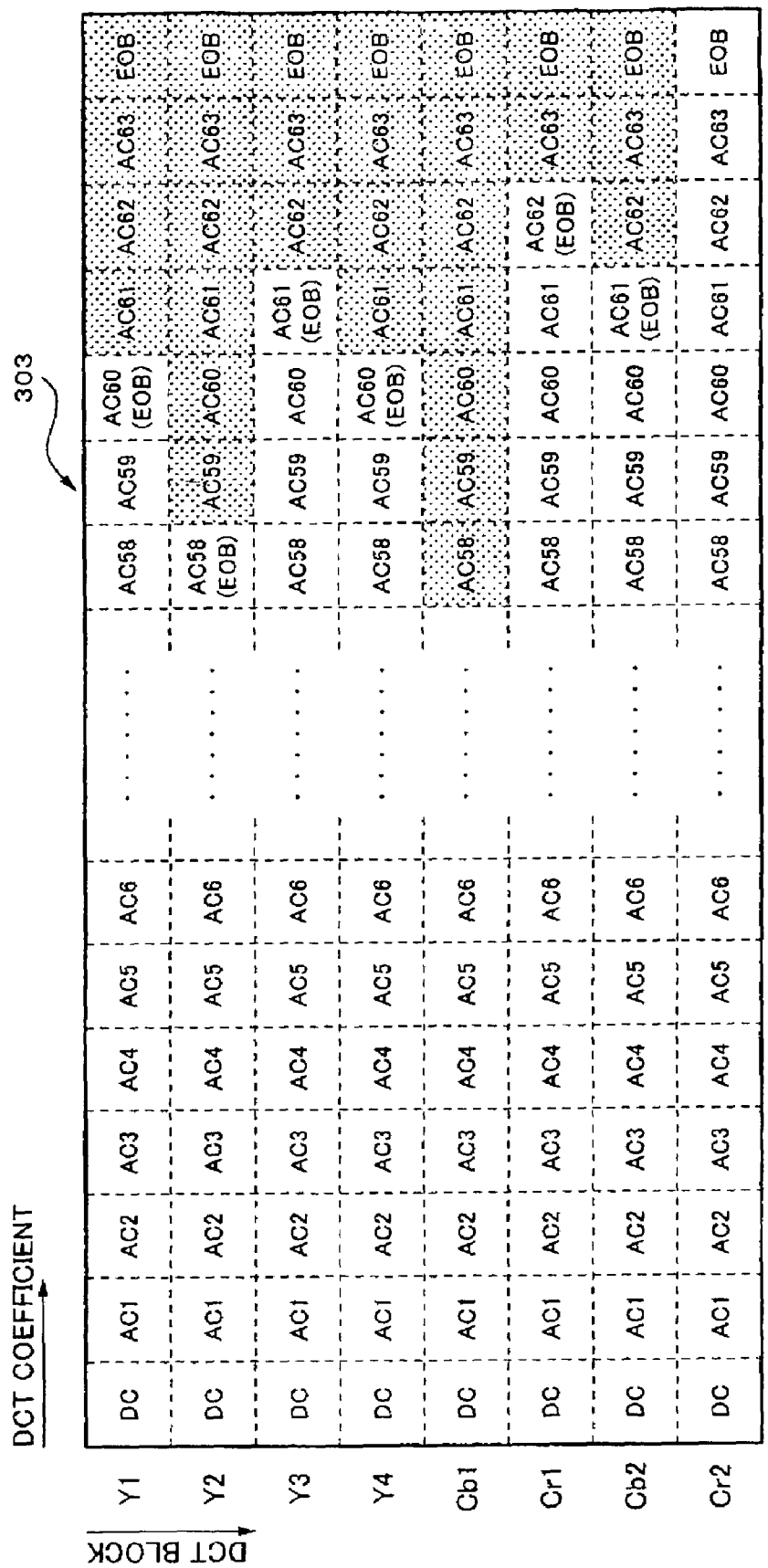
FIG. 33 is a schematic diagram showing a data arrangement in the case that data for one macro block is written to a memory.
Figure 34:
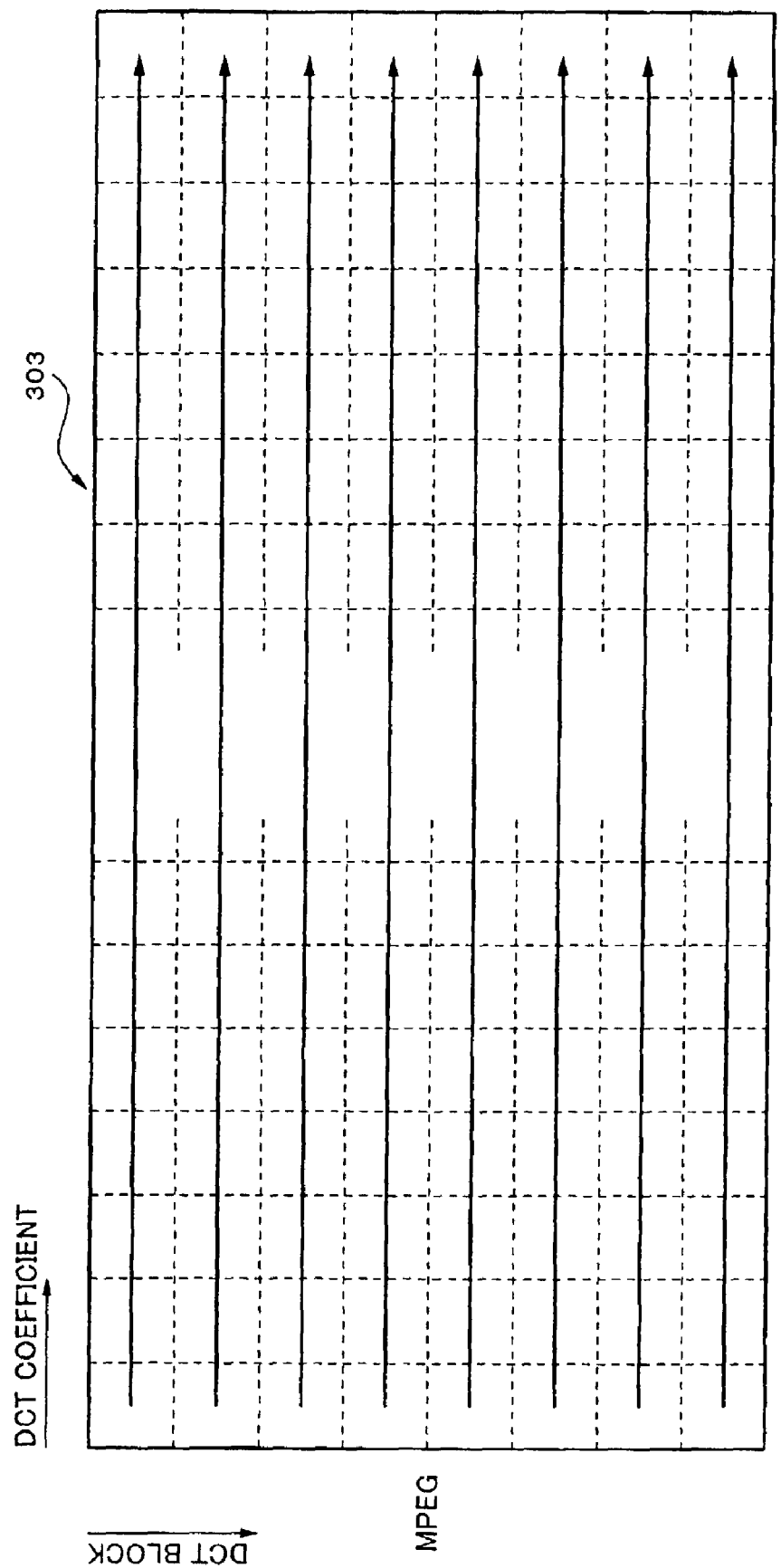
FIG. 34 is a schematic diagram showing an example of a memory accessing method.
Figure 35:
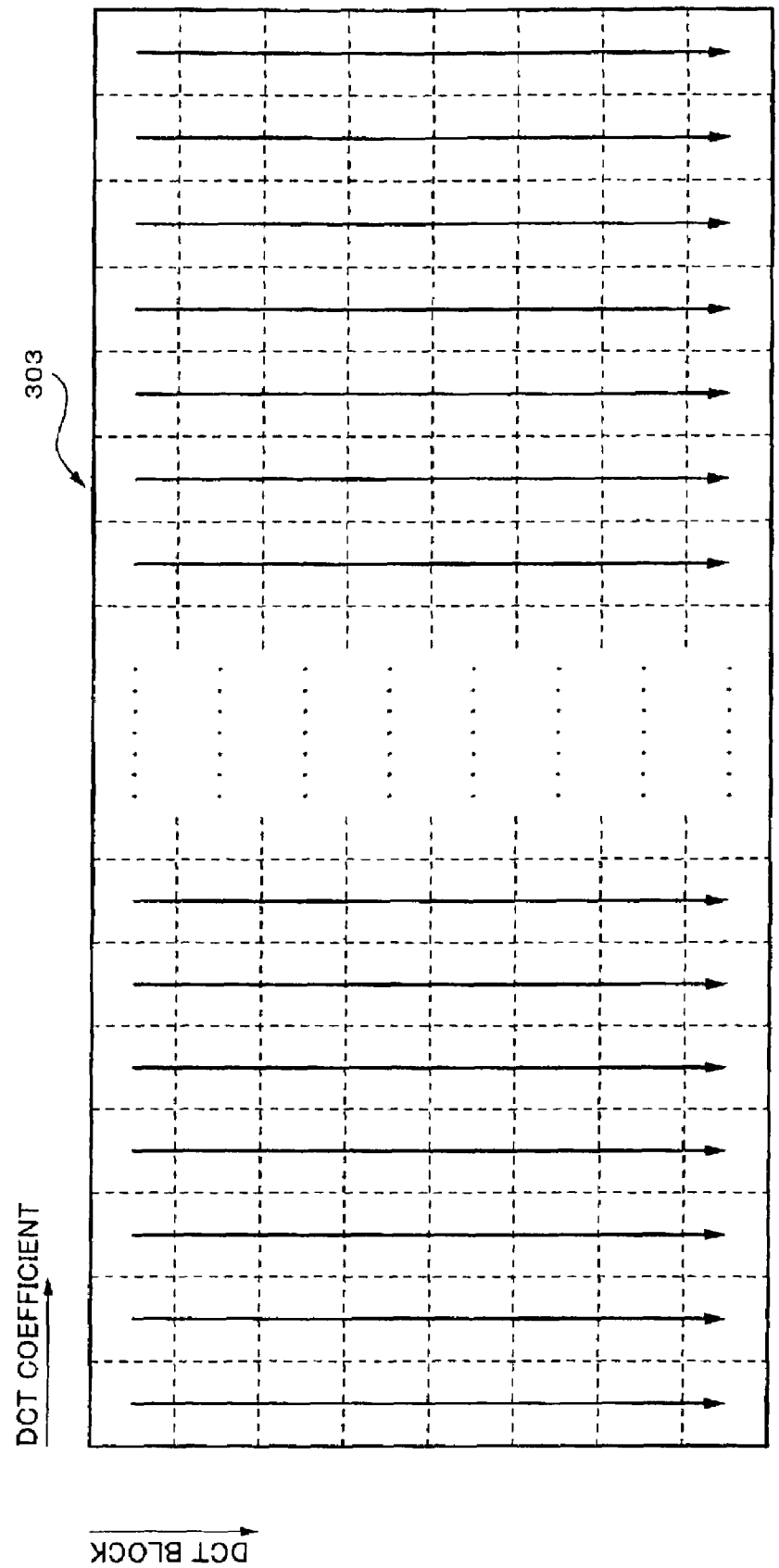
FIG. 35 is a schematic diagram showing an example of a memory accessing method.

FIG. 33 shows an outline of a data arrangement of which data for one macro block has been written to the memory 303. FIGS. 34 and 35 show an example of an accessing method for the memory 303. In the example shown in FIG. 33, DCT blocks are arranged in the vertical direction (row direction), whereas DCT coefficients for each DCT are arranged in the horizontal direction (column direction). The DCT coefficients are arranged in the order of a DC component and AC components from the lowest order component to the higher order component. At the end of DCT coefficients, an EOB (End Of Block) that represents the end of the block is placed. An EOB is data composed of a predetermined bit sequence. For example, a DCT block $Y_1$ does not contain a coefficient AC61 and higher order coefficients. Thus, an EOB is placed at the end of the coefficient AC60.

As shown in FIG. 34, data that is output from the VLD 301 is written in the column direction for each row of each DCT block. The written data is read in the row direction for each column as shown in FIG. 35. As a result, the DCT coefficients are rearranged. At that point, in each row of each DCT block, coefficients preceded by an EOB are ignored. Thereafter, data of the same row of the next DCT block is read.

Data in the row direction is converted into data in the column direction. The converted data is read from the memory 303 and supplied to the VLC 304. Since the data supplied to the VLC 304 contains effective length information, DCT coefficients are connected corresponding to the effective length information and the resultant data is output as a converted stream.

The process of the VLC 304 is controlled corresponding to the signal vlc_timings selected and supplied by the selector 311B. In other words, when a stream is recorded, the signals shown in FIGS. 28B and 28C are selected as the signal vlc_timings corresponding to chroma_format and supplied to the VLC 304. When the chroma format is 4:2:2, the VLC 304 processes all the time slots. In contrast, when the chroma format is 4:2:0, the VLC 304 processes the time slots $Cb_2$ and $Cr_2$ of the chroma format 4:2:2 as null slots.

As was described above, the structure shown in FIG. 30 can be also applied to the reproducing process of the reception side MFC 114. The recording and reproducing processes are switched corresponding to signal pb/rec that represents which of the recording process and the reproducing process is the current process mode. The signal pb/rec is supplied from the system controller 121 through the CPU I/F 312.

When the reproducing process is performed, a converted stream of which DCT coefficients have been rearranged in the order of DC components to AC components from the lowest order component to the highest order component over all DCT coefficients of the macro block. The reception side MFC 114 detects chroma_format from the supplied converted stream and selects time slots corresponding to chroma_format and the signal vld_settings supplied from the system controller 121 through the CPU I/F 312.

When chroma_format represents the chroma format 4:2:2, the time slots shown in FIG. 28C is selected as the signal vld_settings. The signal vld_settings is supplied to the VLD 301. In this case, the VLD 301 performs the process in all the slots. In contrast, when chroma_format represents the chroma format 4:2:0, the time slots shown in FIG. 28B are selected as the signal vld_timings. In the case, the VLD 301 process the slots for the coefficients $Cb_2$ and $Cr_2$ as null slots. In such a manner, when the reproducing process is performed in the VLD 301, it can handle both the chroma formats 4:2:2 and 4:2:0.

The VLD 301 interprets variable length code of the supplied converted stream and writes the interpreted variable length code as data having effective length information in the row direction for each column to the memory 303 in the order shown in FIG. 35. The VLC 304 reads the data in the column direction for each row from the memory 303 the order shown in FIG. 34. The VLC 304 connects the read variable length code and outputs the connected code. Thus, the reception side MFC 114 can convert the reproduced converted stream into an MPEG ES.

When chroma_format represents the chroma format 4:2:2, the time slots shown in FIG. 27C are selected as the signal vlc_timings. The signal vlc_timings is supplied to the VLC 304. In the case, the VLC 304 performs the process in all the time slots. In contrast, when chroma_format represents the chroma format 4:2:2, the time slots shown in FIG. 27B are selected as the signal vlc_timings. The VLC 304 performs the process in the time slots for the coefficients $Cb_2$ and $Cr_2$ that are not present in the chroma format 4:2:0 as null slots. In such a manner, when the reproducing process is performed, the VLC 304 can handle both the chroma formats 4:2:2 and 4:2:0.

In the above description, the embodiment is applied to the chroma formats 4:2:2 and 4:2:0. However, it should be noted that the present invention is not limited to such chroma formats. In other words, the present invention can be applied to the chroma format 4:4:4. In the chroma format 4:4:4, the process is performed for all time slots for $Y_1$ to $Y_4$, $Cb_1$, $Cr_1$, $Cb_2$, $Cr_2$, $Cr_3$, and $Cr_4$. In the chroma format 4:2:2, time slots for $Cb_3$, $Cr_3$, $Cb_4$, and $Cr_4$ are treated as null slots. In the chroma format 4:2:0, time slots for $Cb_2$, $Cr_2$, $Cb_3$, $Cr_3$, $Cb_4$, and $Cr_4$ are treated as null slots.

In the above description, chroma_format is detected from an input stream. However, the present invention is not limited to such an example. For example, chroma_format may be directly supplied from the system controller 121 to the selectors 311A and 311B through the CPU I/F 312 so that they forcedly select the chroma formats. This method is suitable when header information is not reliable due to an occurrence of an error of the header of a stream.

As was described above, according to the present invention, an input digital video signal of the chroma format 4:2:0 can be processed as the same signal as a digital video signal of the chroma format 4:2:2.

Thus, when a MPEG ES is recorded by a VTR, digital video signals of both the chroma formats 4:2:2 and 4:2:0 can be handled without need to change the format of the MPEG ES.

Moreover, in the processes of the shuffling, error correction code encoding, error correction code decoding, and so forth that closely depend on the record format of the VTR, it is not necessary to recognize whether the chroma format of the MPEG ES is 4:2:2 or 4:2:0.

Only a small change of a converting process of the stream converter for a converted stream of which DCT coefficients have been rearranged is required.

The invention claimed is:

1. A recording apparatus for recording to a record medium a digital video signal of which a screen is divided into first blocks in a predetermined manner, a luminance signal and two color difference signals of each first block being divided into second blocks corresponding to a chroma format based on the ratio of sampling frequencies of the luminance signal and the two color difference signals, in the digital video signal, the luminance signal and the two color difference signals having been compression-encoded for each second block, the recording apparatus, comprising:
   detecting means for detecting a first chroma format that represents the ratio of sampling frequencies of the luminance signal and the two color difference signals of an input digital video signal; and
   controlling means for stopping a process for the input digital video signal in a period corresponding to the difference between a predetermined information amount represented by a second chroma format and the information amount represented by the first chroma format when the information amount represented by the first chroma format is smaller than the information amount of the second chroma format corresponding to the first chroma format detected by said detecting means.

2. The recording apparatus as set forth in claim 1, wherein the input digital video signal is MPEG encoded data.

3. The recording apparatus as set forth in claim 1, wherein in the first chroma format, the ratio of sampling frequencies of the luminance signal and the two color difference signals is 4:2:0, and in the second chroma format, the ratio of sampling frequencies of the luminance signal and the two color difference signals is 4:2:2.

4. The recording apparatus as set forth in claim 1, wherein in the second chroma format, the ratio of sampling frequencies of the luminance signal and the two color difference signals is 4:4:4.

5. A recording method for recording to a record medium a digital video signal of which a screen is divided into first blocks in a predetermined manner, a luminance signal and two color difference signals of each first block being divided into second blocks corresponding to a chroma format based on the ratio of sampling frequencies of the luminance signal and the two color difference signals, in the digital video signal, the luminance signal and the two color difference signals having been compression-encoded for each second block, the recording method, comprising the steps of:
   detecting a first chroma format that represents the ratio of sampling frequencies of the luminance signal and the two color difference signals of an input digital video signal; and
   stopping a process for the input digital video signal in a period corresponding to the difference between a predetermined information amount represented by a second chroma format and the information amount represented by the first chroma format when the information amount represented by the first chroma format is smaller than the information amount of the second chroma format corresponding to the first chroma format detected at the detecting step.

6. A reproducing apparatus for reproducing from a record medium a digital video signal of which a screen is divided into first blocks in a predetermined manner, a luminance signal and two color difference signals of each first block being divided into second blocks corresponding to a chroma format based on the ratio of sampling frequencies of the luminance signal and the two color difference signals, in the digital video signal, the luminance signal and the two color difference signals having been compression-encoded for each second block, the reproducing apparatus, comprising:
   reproducing means for reproducing the digital video signal recorded on the record medium;
   detecting means for detecting a first chroma format that represents the ratio of sampling frequencies of the luminance signal and the two color difference signals of the digital video signal reproduced by said reproducing means; and
   controlling means for stopping a process for the reproduced digital video signal in a period corresponding to the difference between a predetermined information amount represented by a second chroma format and the information amount represented by the first chroma format when the information amount represented by the first chroma format is smaller than the information amount of the second chroma format corresponding to the first chroma format detected by said detecting means.

7. The reproducing apparatus as set forth in claim 6, wherein the input digital video signal is MPEG encoded data.

8. The reproducing apparatus as set forth in claim 6, wherein in the first chroma format, the ratio of sampling frequencies of the luminance signal and the two color difference signals is 4:2:0, and in the second chroma format, the ratio of sampling frequencies of the luminance signal and the two color difference signals is 4:2:2.

9. The reproducing apparatus as set forth in claim 6, wherein in the second chroma format, the ratio of sampling frequencies of the luminance signal and the two color difference signals is 4:4:4.

10. A reproducing method for reproducing from a record medium a digital video signal of which a screen is divided into first blocks in a predetermined manner, a luminance signal and two color difference signals of each first block being divided into second blocks corresponding to a chroma format based on the ratio of sampling frequencies of the luminance signal and the two color difference signals, in the digital video signal, the luminance signal and the two color difference signals having been compression-encoded for each second block, the reproducing method, comprising the steps of:
   reproducing the digital video signal recorded on the record medium;
   detecting a first chroma format that represents the ratio of sampling frequencies of the luminance signal and the two color difference signals of the digital video signal reproduced at the reproducing step; and
   stopping a process for the reproduced digital video signal in a period corresponding to the difference between a predetermined information amount represented by a second chroma format and the information amount represented by the first chroma format when the information amount represented by the first chroma format is smaller than the information amount of the second chroma format corresponding to the first chroma format detected at the detecting step.

* * * * *